(12) United States Patent
Saitoh et al.

(10) Patent No.: US 9,915,837 B2
(45) Date of Patent: Mar. 13, 2018

(54) OPTICAL FILM, POLARIZING PLATE, AND LIQUID CRYSTAL DISPLAY DEVICE

(71) Applicant: FUJIFILM Corporation, Tokyo (JP)

(72) Inventors: Yukito Saitoh, Kanagawa (JP); Katsufumi Ohmuro, Kanagawa (JP); Akiko Watano, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 124 days.

(21) Appl. No.: 15/018,220

(22) Filed: Feb. 8, 2016

(65) Prior Publication Data
US 2016/0154276 A1 Jun. 2, 2016

Related U.S. Application Data

(63) Continuation of application No. PCT/JP2014/070590, filed on Aug. 5, 2014.

(30) Foreign Application Priority Data

Aug. 12, 2013 (JP) ................................. 2013-167922

(51) Int. Cl.
*G02B 5/30* (2006.01)
*G02F 1/1335* (2006.01)
(Continued)

(52) U.S. Cl.
CPC .......... *G02F 1/133606* (2013.01); *B32B 7/00* (2013.01); *B32B 7/02* (2013.01);
(Continued)

(58) Field of Classification Search
CPC .. G02B 5/3083; G02B 5/3033; G02B 5/3025; G02F 1/13363; G02F 2202/40; G02F 1/133528; Y10T 428/1041
See application file for complete search history.

(56) References Cited

U.S. PATENT DOCUMENTS 6,096,375 A * 8/2000 Ouderkirk ............. B29C 55/023
359/487.02
9,110,203 B2 8/2015 Seo et al.
(Continued)

FOREIGN PATENT DOCUMENTS

JP 2005-096108 A 4/2005
JP 2012-169271 A 9/2012

OTHER PUBLICATIONS

International Preliminary Report on Patentability issued by WIPO dated Feb. 25, 2016, in connection with International Patent Application No. PCT/JP2014/070590.
International Search Report issued in connection with International Patent Application No. PCT/JP2014/070590 dated Nov. 4, 2014.
(Continued)

*Primary Examiner* — Jia Pan
(74) *Attorney, Agent, or Firm* — Edwards Neils LLC; Jean C. Edwards, Esq.

(57) ABSTRACT

Provided is a liquid crystal display device including a liquid crystal cell, a backlight side polarizer, an optical thin film which forms an air interface, and a backlight unit, in this order. The liquid crystal display device satisfies n (535)<nu (535) and n (535)×d is 1.15-1.25 μm, 1.42-1.52 μm or 1.69-1.79 μm in which n (535) and nu (535) represent a refractive index of the optical thin film and a layer directly adjacent to the optical thin film, respectively, and d represents a thickness of the optical thin film. The liquid crystal display device is capable of matching a peak of light transmittance to light emission peak wavelength of emission line light of RGB. The layer directly adjacent to the optical thin film is the backlight side polarizer or the substrate.

21 Claims, 3 Drawing Sheets

(51) Int. Cl.
*G02F 1/13363* (2006.01)
*B32B 7/02* (2006.01)
*G02B 5/20* (2006.01)
*B32B 7/00* (2006.01)
*G02B 1/11* (2015.01)

(52) U.S. Cl.
CPC ............... *G02B 1/11* (2013.01); *G02B 5/201* (2013.01); *G02B 5/3033* (2013.01); *G02B 5/3083* (2013.01); *G02F 1/13362* (2013.01); *G02F 1/133502* (2013.01); *G02F 1/133621* (2013.01); *B32B 2307/40* (2013.01); *G02B 5/3025* (2013.01); *G02F 1/13363* (2013.01); *G02F 1/133528* (2013.01); *G02F 2001/133507* (2013.01); *G02F 2001/133567* (2013.01); *G02F 2001/133614* (2013.01); *G02F 2001/133624* (2013.01)

(56) References Cited

U.S. PATENT DOCUMENTS

| | | | |
|---|---|---|---|
| 2008/0062366 A1* | 3/2008 | Ohtani | C08J 5/18 349/122 |
| 2008/0297703 A1* | 12/2008 | Kawanishi | B29C 41/28 349/96 |
| 2009/0092771 A1* | 4/2009 | Sasata | C08L 1/10 428/1.31 |
| 2012/0206935 A1 | 8/2012 | Seo et al. | |

OTHER PUBLICATIONS

Written Opinion issued in connection with International Patent Application No. PCT/JP2014/070590 dated Nov. 4, 2014.

Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.

* cited by examiner

OPTICAL FILM, POLARIZING PLATE, AND LIQUID CRYSTAL DISPLAY DEVICE

CROSS-REFERENCE TO RELATED APPLICATIONS

This application is a Continuation of PCT International Application No. PCT/JP2014/070590, filed on Aug. 5, 2014, which was published under PCT Article 21(2) in Japanese, and claims priority under 35 U.S.C. Section 119(a) to Japanese Patent Application No. 2013-167922 filed on Aug. 12, 2013. The above applications are hereby expressly incorporated by reference, in their entirety, into the present application.

BACKGROUND OF THE INVENTION

1. Field of the Invention

The present invention relates to an optical film, a polarizing plate, and a liquid crystal display device. More specifically, the present invention relates to a liquid crystal display device with high light transmittance and high color reproducibility; an optical film used for this liquid crystal display device; and a polarizing plate using this optical film.

2. Description of the Related Art

The application of a flat panel display such as a liquid crystal display device (hereinafter, also referred to as an LCD) is widened as a space-saving image display device with low power consumption, every year. The liquid crystal display device has a configuration in which, for example, a backlight (hereinafter, also referred to as BL), a backlight side polarizing plate, a liquid crystal cell, and a viewing-side polarizing plate are provided in this order.

In the flat panel display market in recent years, improvement in saving of power, high definition, and color reproducibility has progressed in order to improve the performance of an LCD, and such improvement has occurred markedly in small-sized tablet PCs, smart phones, and the like. However, development of next-generation high-definition (4K2K, greater than or equal to 100% of EBU ratio) in the present TV standards (FHD: 72% of National Television System Committee (NTSC) ratio≅100% of European Broadcasting Union (EBU) ratio) is also progressing. However, in order, for the next-generation high-definition to become widespread in the market, reduction in costs with functions of members being more integrated in which the number of members is reduced is required.

A method for improving light utilization efficiency of a backlight which is required for saving power has been reviewed. For example, JP2012-169271A discloses a method for realizing high luminance and improving color reproducibility by realizing white light by emitting emission line light (blue light, green light, and red light with a small FWHM) of RGB using a quantum dot (hereinafter, also referred to as QD) which emits red light and green light, as a fluorescent body, between a blue LED and a light guide plate.

In SID'12 DIGEST, p. 895, a method in which light conversion sheets using a quantum dot enhancement film (QDEF) are combined in order to improve color reproducibility of an LCD is proposed.

In addition, devices for improving transmittance have been reviewed in order to improve light utilization efficiency of an optical film member used for a liquid crystal display device. For example, in JP2005-96108A, a method for achieving both of high total light transmittance and high barrier properties by adjusting the film thickness of each layer of barrier films, which are used for an optical member or the like of a FPD and have a substrate, a first inorganic layer, an organic film, and a second inorganic film in this order, is proposed.

SUMMARY OF THE INTENTION

However, fluorescent light (FL) application techniques illustrated in JP2012-169271A and SID'12 DIGEST, p. 895 realize high luminance and improvement in color reproducibility using white light which is realized by emitting emission line light of RGB using a quantum dot (hereinafter, also referred to as QD), but more improvement of light transmittance is required.

In addition, the method for improving total light transmittance of the barrier film disclosed in JP2005-96108A is merely a method for increasing an average value of the total light transmittance within a range in a visible light region of 380 nm to 800 nm. In addition, the average value of the total light transmittance of the optical film member obtained in the Example in JP2005-96108A is at most 90%, and therefore, more improvement of light transmittance is required.

In this manner, improvement in BL light utilization efficiency required for saving power and improvement in high definition (reduction in opening ratio) and color reproducibility (reduction in transmittance of a color filter (hereinafter, also referred to as CF) are in a trade-off relation, and therefore, realization of both of the improvement in light utilization efficiency and color reproducibility is a problem.

The problem to be solved by the present invention is to provide a liquid crystal display device with high light transmittance and a high color reproducibility region.

The present inventors have conducted extensive studies in order to improve the above-described problems, and as a result, they have found the following. In a liquid crystal display device using emission of emission line light (full width at half maximum (FWHM) of less than or equal to 100 nm) of RGB, it is possible to match a peak of light transmittance to light emission peak wavelength of emission line light of RGB and to obtain maximum luminance of the liquid crystal display device using the emission line light of RGB, by making a product of the refractive index and the thickness of an optical thin film of a single layer (constituted of one layer) be in a certain relationship by providing the optical thin film thereof at an air interface of a member on a backlight side rather than at an air interface of a backlight side polarizer or in the backlight side polarizer. Therefore, it is possible to realize both of high light transmittance and color reproducibility.

That is, the above-described problem can be solved by the present invention having the following configuration.

[1] A liquid crystal display device including:
a liquid crystal cell;
a backlight side polarizer;
an optical thin film which is disposed so as to be directly adjacent to a side of the backlight side polarizer opposite to the liquid crystal cell or is disposed with a substrate therebetween, and forms an air interface; and
a backlight unit, in this order,
in which the liquid crystal display device satisfies the following Expression (1),
in which the liquid crystal display device satisfies any one of the following Expressions (2-1), (2-2), and (2-3),
in which all transmittances at a Y value of an XYZ color system in a wavelength range of 430 nm to 470 nm, in a wavelength range of 515 nm to 555 nm, and in a wavelength range of 600 nm to 650 nm of a laminated body constituted of the optical thin film and a layer directly adjacent to the optical thin film are greater than those at a Y value of an XYZ color system in a wavelength range of greater than 470 nm and less than 515 nm and in a wavelength range of greater than 555 nm and less than 600 nm, and in which the backlight unit emits blue light which has a light emission center wavelength in a wavelength range of 430 nm to 480 nm and has a peak of light emission intensity with a full width at half maximum of less than or equal to 100 nm, green light which has a light emission center wavelength in a wavelength range of 500 nm to 600 nm and has a peak of light emission intensity with a full width at half maximum of less than or equal to 100 nm, and red light which has a light emission center wavelength in a wavelength range of 600 nm to 650 nm and has a peak of light emission intensity with a full width at half maximum of less than or equal to 100 nm.

$$n(535) < nu(535) \quad \text{Expression (1)}$$

(In Expression (1), n (535) represents a refractive index of the optical thin film at a wavelength of 535 nm and nu (535) represents a refractive index of the layer directly adjacent to the optical thin film at a wavelength of 535 nm)

$$1.15\ \mu m \leq n(535) \times d \leq 1.25\ \mu m \quad \text{Expression (2-1)}$$

$$1.42\ \mu m \leq n(535) \times d \leq 1.52\ \mu m \quad \text{Expression (2-2)}$$

$$1.69\ \mu m \leq n(535) \times d \leq 1.79\ \mu m \quad \text{Expression (2-3)}$$

(In Expressions (2-1), (2-2), and (2-3), n (535) represents a refractive index of the optical thin film at a wavelength of 535 nm and d represents a thickness of the optical thin film (unit: μm))

[2] It is preferable that the liquid crystal display device according to [1] further has a luminance improvement film between the backlight unit and the optical thin film.

[3] It is preferable that, in the liquid crystal display device according to [2], the luminance improvement film and the optical thin film are bonded to each other so as to provide an air interface at least on a part of the surface of the optical thin film on the luminance improvement film side.

[4] It is preferable that, in the liquid crystal display device according to any one of [1] to [3], the backlight side polarizer and the optical thin film are disposed with a substrate therebetween.

[5] It is preferable that, in the liquid crystal display device according to [4], the substrate is a cellulose acylate film, an acrylic film, or a polyester film.

[6] It is preferable that, in the liquid crystal display device according to any one of [1] to [3], the backlight side polarizer and the optical thin film are disposed so as to be directly adjacent to each other.

[7] It is preferable that, in the liquid crystal display device according to [1] to [6], the liquid crystal display device satisfies any one of the following Expressions (2-1A), (2-2A), and (2-3A).

$$1.16\ \mu m \leq n(535) \times d \leq 1.24\ \mu m \quad \text{Expression (2-1A)}$$

$$1.46\ \mu m \leq n(535) \times d \leq 1.51\ \mu m \quad \text{Expression (2-2A)}$$

$$1.70\ \mu m \leq n(535) \times d \leq 1.78\ \mu m \quad \text{Expression (2-3A)}$$

(In Expressions (2-1A), (2-2A), and (2-3A), n (535) represents a refractive index of the optical thin film at a wavelength of 535 nm and d represents a thickness of the optical thin film (unit: μm))

[8] It is preferable that, in the liquid crystal display device according to [7], the liquid crystal display device satisfies the above-described Expression (2-2A).

[9] It is preferable that, in the liquid crystal display device according to any one of [1] to [8], all transmittances at a Y value of an XYZ color system in a wavelength range of 430 nm to 470 nm, in a wavelength range of 515 nm to 555 nm, and in a wavelength range of 600 nm to 650 nm of a laminated body constituted of the optical thin film and a layer directly adjacent to the optical thin film are greater than or equal to 97%.

[10] It is preferable that, in the liquid crystal display device according to any one of [1] to [9], all transmittances at a Y value of an XYZ color system in a wavelength range of greater than 470 nm and less than 515 nm and in a wavelength range of greater than 555 nm and less than 600 nm of a laminated body constituted of the optical thin film and a layer directly adjacent to the optical thin film are less than 97%.

[11] An optical film including:

a polarizer or a substrate; and an optical thin film which is disposed so as to be directly adjacent on either surface of the polarizer or the substrate and forms an air interface, in which the optical film satisfies the following Expression (1), in which the optical film satisfies any one of the following Expressions (2-1), (2-2), and (2-3), in which all transmittances at a Y value of an XYZ color system in a wavelength range of 430 nm to 470 nm, in a wavelength range of 515 nm to 555 nm, and in a wavelength range of 600 nm to 650 nm are greater than those at a Y value of an XYZ color system in a wavelength range of greater than 470 nm and less than 515 nm and in a wavelength range of greater than 555 nm and less than 600 nm.

$$n(535) < nu(535) \quad \text{Expression (1)}$$

(In Expression (1), n (535) represents a refractive index of the optical thin film at a wavelength of 535 nm and nu (535) represents a refractive index of the layer directly adjacent to the optical thin film at a wavelength of 535 nm)

$$1.15\ \mu m \leq n(535) \times d \leq 1.25\ \mu m \quad \text{Expression (2-1)}$$

$$1.42\ \mu m \leq n(535) \times d \leq 1.52\ \mu m \quad \text{Expression (2-2)}$$

$$1.69\ \mu m \leq n(535) \times d \leq 1.79\ \mu m \quad \text{Expression (2-3)}$$

(In Expressions (2-1), (2-2), and (2-3), n (535) represents a refractive index of the optical thin film at a wavelength of 535 nm and d represents a thickness of the optical thin film (unit: μm))

[12] It is preferable that the optical film according to [11] further has a luminance improvement film on the surface on the optical thin film side.

[13] It is preferable that, in the optical film according to [12], the luminance improvement film and the optical thin film are bonded to each other so as to have an air interface at least on a part of the surface of the optical thin film on the luminance improvement film side.

[14] It is preferable that the optical film according to any one of [11] to [13] further has a substrate; and the optical thin film which is disposed on one surface of the substrate and forms an air interface.

[15] It is preferable, in the optical film according to [14], the substrate is a cellulose acylate film, an acrylic film, or a polyester film.

[16] It is preferable that the optical film according to any one of [11] to [13] further has a polarizer; and the optical thin film which is disposed on the surface of the polarizer and forms an air interface.

[17] It is preferable that, in the optical film according to any one of [11] to [16], the optical film satisfies any one of the following Expressions (2-1A), (2-2A), and (2-3A).

$$1.16 \text{ μm} \leq n(535) \times d \leq 1.24 \text{ μm} \quad \text{Expression (2-1A)}$$

$$1.46 \text{ μm} \leq n(535) \times d \leq 1.51 \text{ μm} \quad \text{Expression (2-2A)}$$

$$1.70 \text{ μm} \leq n(535) \times d \leq 1.78 \text{ μm} \quad \text{Expression (2-3A)}$$

(In Expressions (2-1A), (2-2A), and (2-3A), n (535) represents a refractive index of the optical thin film at a wavelength of 535 nm and d represents a thickness of the optical thin film (unit: μm))

[18] It is preferable that, in the optical film according to [17], the optical film satisfies the above-described Expression (2-2A).

[19] It is preferable that, in the optical film according to any one of [11] to [18], all transmittances at a Y value of an XYZ color system in a wavelength range of 430 nm to 470 nm, in a wavelength range of 515 nm to 555 nm, and in a wavelength range of 600 nm to 650 nm are greater than or equal to 97%.

[20] It is preferable that, in the optical film according to any one of [11] to [19], all transmittances at a Y value of an XYZ color system in a wavelength range of greater than 470 nm and less than 515 nm and in a wavelength range of greater than 555 nm and less than 600 nm are less than 97%.

[21] A polarizing plate including: the optical film according to any one of [11] to [20].

According to the present invention, it is possible to provide a liquid crystal display device with high light transmittance and a high color reproducibility region.

DESCRIPTION OF THE PREFERRED EMBODIMENTS

Figure 1:
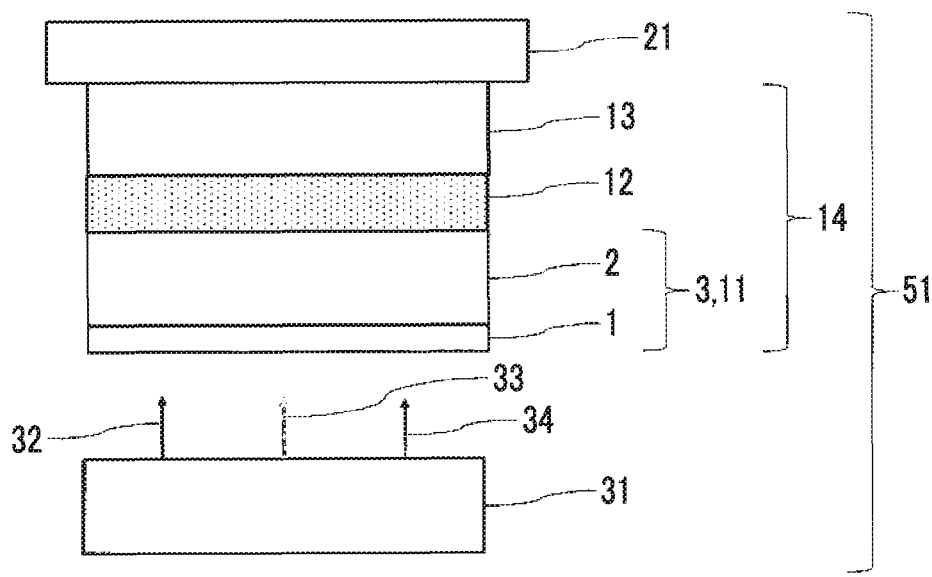
FIG. 1 is a schematic view showing a cross section of an example of a liquid crystal display device of the present invention.

Hereinafter, a liquid crystal display device, a retardation film, and a polarizing plate will be described in detail.

The description of configuration requirements described below is made based on a representative embodiment of the present invention. However, the present invention is not limited to such an embodiment. In the present specification, the numerical range represented by "~" means a range including numerical values denoted before and after "~" as a lower limit value and an upper limit value.

In the present specification, the "FWHM" of a peak is referred to as a width of a peak at one half of the height of the peak.

In addition, in the present specification, the description of "(meth)acrylate" represents a meaning of "at least any of acrylate and methacrylate". The same applies to "(meth)acrylic resin", "(meth)acrylic acid", "(meth)acryloyl", and the like.

In addition, in the present specification, numerical values, numerical ranges, and qualitative expressions (for example, expressions such as "same" and "equivalent") showing optical characteristics of members of an optical film, or a liquid crystal layer are interpreted as indicating numerical values, which include generally allowable errors, numerical ranges, and properties of a liquid crystal display device or members used for the liquid crystal display device.

In addition, in the description in the present specification, in a case where the arrangement between axes and directions or the angle of an intersecting angle is expressed as "parallel to", "orthogonal to", "0°", "90°", and the like are simply mentioned without indicating any range, and these mean "approximately parallel to", "approximately orthogonal to", "approximately 0°", and "approximately 90°", and are not exact. Some deviation is allowed within a range in which purposes are achieved. For example, "parallel" or "0°" means that the intersecting angle is approximately 0°, and is −10° to 10°, preferably −5° to 5°, and more preferably −3° to 3°. "Orthogonal to" or "90°" means that the intersecting angle is approximately 90°, and is 80° to 100°, preferably 85° to 95°, and more preferably 87° to 93°.

[Liquid Crystal Display Device]

The liquid crystal display device of the present invention has: a liquid crystal cell; a backlight side polarizer; an optical thin film which is disposed so as to be directly adjacent to (in direct contact with) a side of the backlight side polarizer opposite to the liquid crystal cell or is disposed with a substrate therebetween, and forms an air interface; and a backlight unit, in this order, in which the liquid crystal display device satisfies the following Expression (1), in which the liquid crystal display device satisfies any one of the following Expressions (2-1), (2-2), and (2-3), in which all transmittances at a Y value of an XYZ color system in a wavelength range of 430 nm to 470 nm, in a wavelength range of 515 nm to 555 nm, and in a wavelength range of 600 nm to 650 nm of a laminated body constituted of the optical thin film and a layer directly adjacent to the optical thin film are greater than those at a Y value of an XYZ color system in a wavelength range of greater than 470 nm and less than 515 nm and in a wavelength range of greater than 555 nm and less than 600 nm, and in which the backlight unit emits blue light which has a light emission center wavelength in a wavelength range of 430 nm to 480 nm and has a peak of light emission intensity with a FWHM of less than or equal to 100 nm, green light which has a light emission center wavelength in a wavelength range of 500 nm to 600 nm and has a peak of light emission intensity with a FWHM of less than or equal to 100 nm, and red light which has a light emission center wavelength in a wavelength range of 600 nm to 650 nm and has a peak of light emission intensity with a FWHM of less than or equal to 100 nm.

$$n(535) < nu(535) \quad \text{Expression (1)}$$

(In Expression (1), n (535) represents a refractive index of the optical thin film at a wavelength of 535 nm and nu (535) represents a refractive index of the layer directly adjacent to the optical thin film at a wavelength of 535 nm.)

$$1.15 \ \mu m \leq n(535) \times d \leq 1.25 \ \mu m \quad \text{Expression (2-1)}$$

$$1.42 \ \mu m \leq n(535) \times d \leq 1.52 \ \mu m \quad \text{Expression (2-2)}$$

$$1.69 \ \mu m \leq n(535) \times d \leq 1.79 \ \mu m \quad \text{Expression (2-3)}$$

(In Expressions (2-1), (2-2), and (2-3), n (535) represents a refractive index of the optical thin film at a wavelength of 535 nm and d represents a thickness of the optical thin film (unit: μm).)

In addition, the optical film of the present invention has: a polarizer or a substrate; and an optical thin film which is disposed so as to be directly adjacent on either surface of the polarizer or the substrate and forms an air interface, in which the optical film satisfies the following Expression (1), in which the optical film satisfies any one of the following Expressions (2-1), (2-2), and (2-3), in which all transmittances at a Y value of an XYZ color system in a wavelength range of 430 nm to 470 nm, in a wavelength range of 515 nm to 555 nm, and in a wavelength range of 600 nm to 650 nm are greater than those at a Y value of an XYZ color system in a wavelength range of greater than 470 nm and less than 515 nm and in a wavelength range of greater than 555 nm and less than 600 nm.

$$n(535) < nu(535) \quad \text{Expression (1)}$$

(In Expression (1), n (535) represents a refractive index of the optical thin film at a wavelength of 535 nm and nu (535) represents a refractive index of the layer directly adjacent to the optical thin film at a wavelength of 535 nm.)

$$1.15 \ \mu m \leq n(535) \times d \leq 1.25 \ \mu m \quad \text{Expression (2-1)}$$

$$1.42 \ \mu m \leq n(535) \times d \leq 1.52 \ \mu m \quad \text{Expression (2-2)}$$

$$1.69 \ \mu m \leq n(535) \times d \leq 1.79 \ \mu m \quad \text{Expression (2-3)}$$

(In Expressions (2-1), (2-2), and (2-3), n (535) represents a refractive index of the optical thin film at a wavelength of 535 nm and d represents a thickness of the optical thin film (unit: μm).)

With such a configuration, the liquid crystal display device of the present invention which has an optical film of the present invention as a laminated body constituted of an optical thin film and a layer directly adjacent to this optical thin film has high light transmittance and a high color reproducibility region.

The present invention is not bound by any theory, but such effects can be obtained due to the following reasons.

Wavelength dependency of light transmittance (of the above-described laminated body constituted of an optical thin film and a layer directly adjacent to this optical thin film) of the optical film of the present invention is highly dependent on the film thickness and the refractive index of the optical thin film of the uppermost surface, that is, the optical thin film of an air interface. This is because a reflection is caused in which the difference between the refractive index (1.0) of air and the refractive index (generally about 1.3 to 1.7) of the layer directly adjacent to the optical thin film in the optical film is large. As a method for suppressing this reflection and improving light transmittance, a method of using interference of light is known, and the light transmittance becomes a maximum under the conditions in which the optical film satisfies the following expression.

$$nd = (2m-1)*\lambda/4$$

(Here, n represents a refractive index of the optical thin film, d represents a film thickness (unit: μm) of the optical thin film, m represents a degree of interference and a natural number, and λ represents a wavelength which is reflected. However, the refractive index nu of the layer directly adjacent to the optical thin film is greater than the refractive index n of the optical thin film.)

The light transmittance T at a wavelength λ of the optical film is approximately represented by the following Expression (here, A and C are fixed numbers, and are determined by a configuration of a layer in the layer directly adjacent to the optical thin film of the optical film and in a layer therebeneath).

$$T = A*\sin^2(2*d/\lambda*(2m-1)) + C$$

The present inventors have repeated a large amount of trial and error, and as a result, they have found that it is possible to match a peak of the light transmittance of the optical film with a peak of light emission intensity of a triple-wavelength backlight in a form of being exactly combined with the peak of light emission intensity of the triple-wavelength backlight, by setting m to 5 to 7 (preferably m=6) in the above-described expression of the light transmittance T, and to obtain maximum light transmittance. This method is different from the method using a multilayer film disclosed in JP2005-96108A in the related art. Moreover, with this method, it is possible to improve light transmittance with the provision of only one layer with an optical thin film, which is preferable. In addition, in the multilayer film in the related art, coating properties are deteriorated since a thin film of about 0.1 μm is required, and it is difficult to control the film thickness. However, in the present invention, an optical thin film which is thicker than an optical thickness of about 1 μm is used. Therefore, in a case of manufacturing an optical thin film through, for example, coating, it becomes easy to control the film thickness of the optical thin film since coating properties are improved or the like. Therefore, it is possible to reliably match a peak, at which the light transmittance becomes a maximum, with a peak of light emission intensity of a backlight.

Hereinafter, preferred modes of liquid crystal display devices of the present invention will be described.

<Overall Configuration of Liquid Crystal Display Device>

First, preferred configurations of the liquid crystal display devices of the present invention will be described based on FIGS. 1 to 5. However, the liquid crystal display devices of the present invention are not interpreted to be limited by the drawings.

Liquid crystal display devices 51 of the present invention shown in FIGS. 1 to 5 have a liquid crystal cell 21; a backlight side polarizer 12; an optical thin film 1 which is disposed so as to be directly adjacent to a side of this backlight side polarizer 12 opposite to this liquid crystal cell 21 or is disposed with a substrate 2 therebetween, and forms an air interface; and a backlight unit 31, in this order. In these liquid crystal display devices, the backlight unit 31 emits blue light 32 in which the backlight unit 31 has a light emission center wavelength in a wavelength range of 430 nm to 480 nm and has a peak of light emission intensity with a FWHM of less than or equal to 100 nm; green light 33 which has a light emission center wavelength in a wavelength range of 500 nm to 600 nm and has a peak of light emission intensity with a FWHM of less than or equal to 100 nm; and red light 34 which has a light emission center wavelength in a wavelength range of 600 nm to 650 nm and has a peak of light emission intensity with a FWHM of less than or equal to 100 nm.

In the liquid crystal display devices 51 of the present invention shown in FIGS. 1 to 3 and 5, a laminated body 3 constituted of an optical thin film and a layer directly adjacent to the optical thin film corresponds to a laminated body constituted of an optical thin film 1 and the substrate 2, and the backlight side polarizer 12 and the optical thin film 1 are disposed with the substrate 2 therebetween. The laminated body 3 constituted of this optical thin film and the layer directly adjacent to the optical thin film is used as an (outer-side) polarizing plate protective film 11 of a backlight side polarizing plate 14.

The liquid crystal display devices 51 of the present invention preferably have an (inner-side) polarizing plate protective film 13 between the backlight side polarizer 12 and the liquid crystal cell 21 as shown in FIGS. 1 to 5. In the present specification, the polarizing plate protective film on a side close to the liquid crystal cell with respect to the polarizer is called an inner-side polarizing plate protective film and the polarizing plate protective film on a side far from the liquid crystal cell with respect to the polarizer is called an outer-side polarizing plate protective film.

Figure 2:
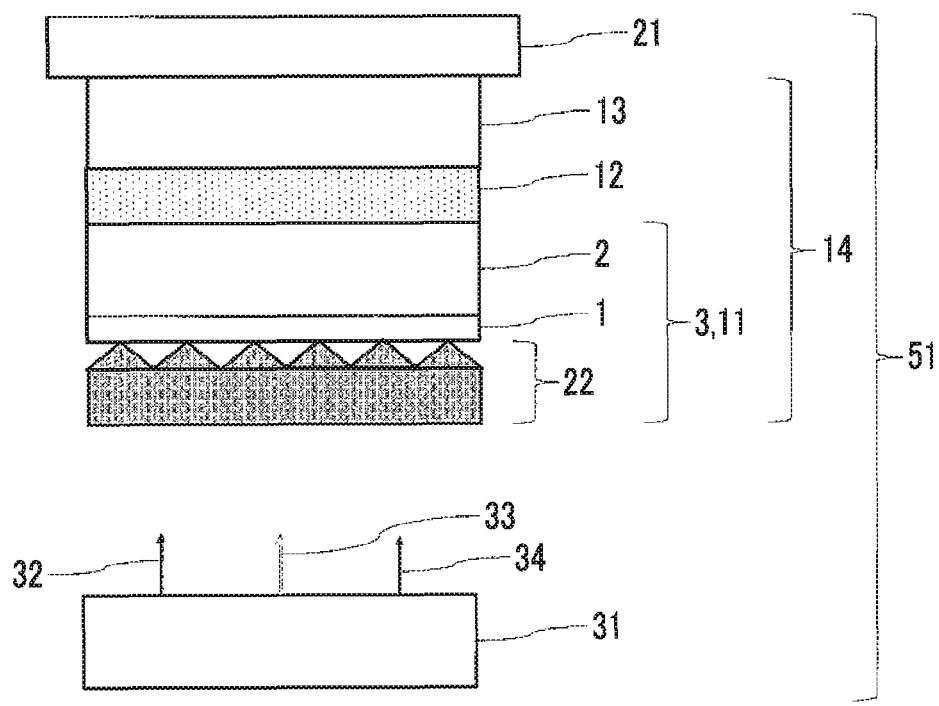
FIG. 2 is a schematic view showing a cross section of another example of the liquid crystal display device of the present invention and is a mode in which a luminance improvement film is laminated on an optical thin film so as to have an air interface on the optical thin film.
Figure 3:
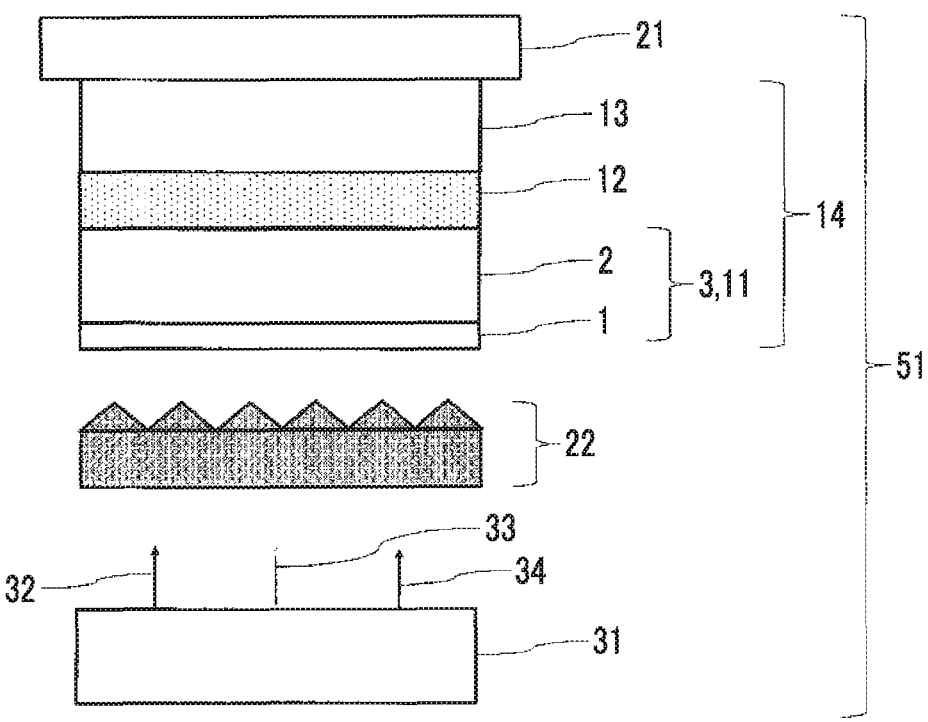
FIG. 3 is a schematic view showing a cross section of another example of the liquid crystal display device of the present invention and is a mode in which a luminance improvement film is disposed without being brought into close contact with the optical thin film.

As shown in FIGS. 2 and 3, the liquid crystal display devices 51 of the present invention preferably have a luminance improvement film between a backlight unit and the optical thin film.

In the liquid crystal display device 51 of the present invention, as shown in FIG. 2, a luminance improvement film 22 and the optical thin film 1 are preferably bonded to each other so as to have an air interface at least on a part of the surface of the optical thin film 1 on the luminance improvement film 22 side. In FIG. 2, the luminance improvement film 22, the optical thin film 1, and the substrate 2 correspond to an optical film of the present invention.

Figure 4:
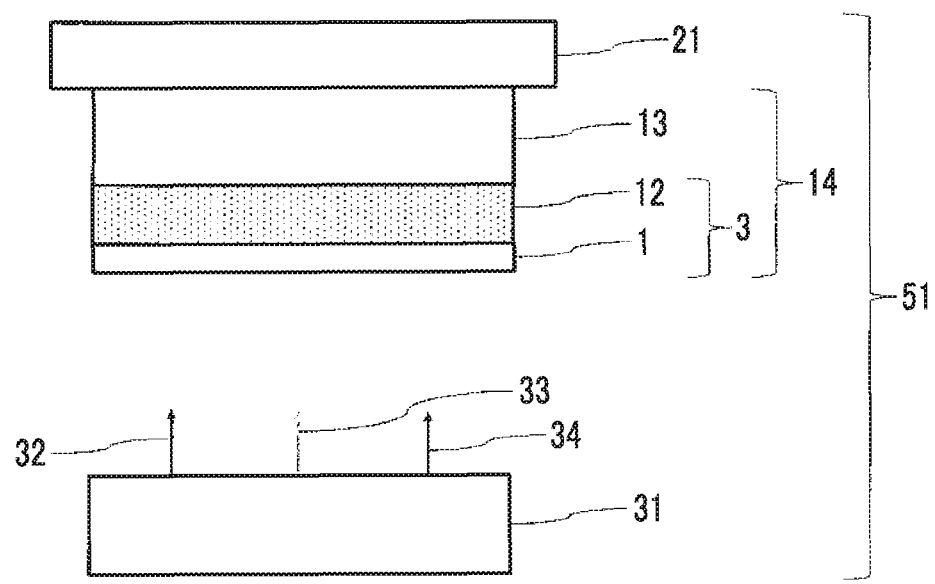
FIG. 4 is a schematic view showing a cross section of another example of the liquid crystal display device of the present invention and is a mode in which an optical thin film is disposed so as to be brought into direct contact with a backlight side polarizer.

In the liquid crystal display device 51 of the present invention shown in FIG. 4, the laminated body 3 constituted of an optical thin film and a layer directly adjacent to the optical thin film corresponds to a laminated body constituted of the optical thin film 1 and the backlight side polarizer 12, and the backlight side polarizer and the optical thin film are disposed so as to be directly adjacent to each other. In addition, the laminated body 3 constituted of this optical thin film and the layer directly adjacent to the optical thin film corresponds to an optical film of the present invention.

Figure 5:
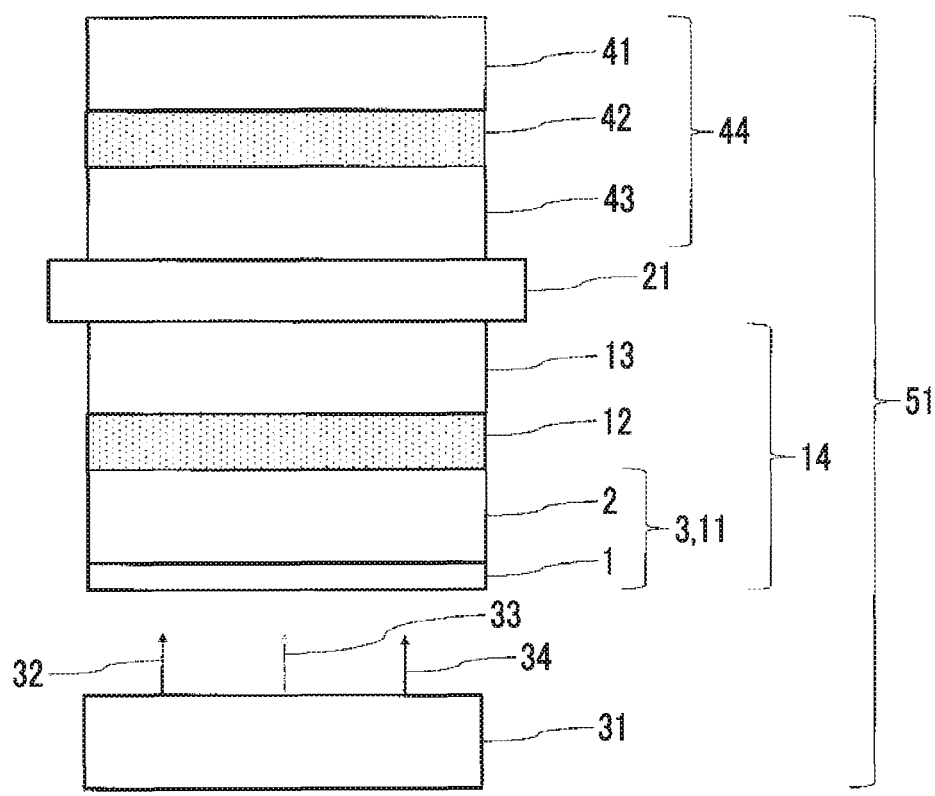
FIG. 5 is a schematic view of a cross section of another example of the liquid crystal display device of the present invention and is a mode in which a display side polarizing plate is disposed.

As shown in FIG. 5, the liquid crystal display device 51 of the present invention preferably has a display side polarizing plate 44. The display side polarizing plate 44 preferably has a configuration in which a polarizer 42 is interposed between two polarizing plate protective films 41 and 43.

<Backlight Side Polarizing Plate>

The liquid crystal display device of the present invention has a backlight side polarizer; and an optical thin film which is disposed so as to be directly adjacent to a side of the backlight side polarizer opposite to the liquid crystal cell or is disposed with a substrate therebetween, and forms an air interface.

In addition, the polarizing plate of the present invention has an optical film of the present invention and preferably has a polarizer and at least one sheet of the optical film of the present invention. Such a polarizing plate of the present invention is preferably used as a backlight side polarizing plate.

Similarly to a backlight side polarizing plate used in a general liquid crystal display device, the backlight side polarizing plate used in the liquid crystal display device of the present invention has a polarizer and two sheets of polarizing plate protective films (hereinafter, also referred to as protective films) which are disposed on both sides thereof and has at least one sheet of the optical film of the present invention within the two protective films, and the optical film of the present invention is preferably used as a protective film disposed on a side opposite to the liquid crystal cell side.

The backlight side polarizing plate of the liquid crystal display device of the present invention may or may not include a polarizing plate protective film on the surface on the backlight side of the backlight side polarizer, but preferably includes the polarizing plate protective film thereon.

(Laminated Body Constituted of Optical Thin Film and Layer Directly Adjacent to this Optical Thin Film)

The liquid crystal display device of the present invention has an optical film of the present invention as a laminated body constituted of an optical thin film and a layer directly adjacent to the optical thin film.

The above-described layer directly adjacent to the optical thin film is a polarizer or a substrate. The above-described polarizer is preferably a backlight side polarizer and the above-described substrate is preferably a substrate of a rear-side (outer-side) polarizing plate protective film of a backlight side polarizing plate.

In addition, in the liquid crystal display device of the present invention, the backlight side polarizer and the optical thin film may be disposed with a substrate therebetween, or may be disposed so as to be directly adjacent to each other. Among these, in the liquid crystal display device of the present invention, the backlight side polarizer and the optical thin film are preferably disposed with a substrate therebetween.

Hereinafter, a laminated body constituted of an optical thin film and a layer directly adjacent to this optical thin film will be described.

The laminated body constituted of an optical thin film and a layer directly adjacent to this optical thin film satisfies the following Expression (1).

$$n(535) < nu(535) \qquad \text{Expression (1)}$$

(In Expression (1), n (535) represents a refractive index of the optical thin film at a wavelength of 535 nm and nu (535) represents a refractive index of the layer directly adjacent to the optical thin film at a wavelength of 535 nm.)

If the refractive index n (535) of the optical thin film is smaller than the refractive index nu (535) of the layer directly adjacent to the optical thin film, the effect of the present invention can be obtained. A case of n (535)={nu (535)} ½ is preferable in view of improving the transmittance. However, it is possible to actually select a material for the refractive index nu of the layer directly adjacent to the optical thin film in consideration of cost, coating properties, or the like of the material.

It is preferable that, in the liquid crystal display device of the present invention, all transmittances at a Y value of an XYZ color system in a wavelength range of 430 nm to 470 nm, in a wavelength range of 515 nm to 555 nm, and in a wavelength range of 600 nm to 650 nm of a laminated body constituted of an optical thin film and a layer directly adjacent to this optical thin film are greater than or equal to 97%. It is more preferable that the transmittance at a Y value of an XYZ color system in a wavelength range of 515 nm to 555 nm of the laminated body constituted of an optical thin film and the layer directly adjacent to this optical thin film is greater than or equal to 98%. It is particularly preferable that all of the transmittances at a Y value of an XYZ color system in a wavelength range of 430 nm to 470 nm, in a wavelength range of 515 nm to 555 nm, and in a wavelength range of 600 nm to 650 nm of the laminated body constituted of an optical thin film and the layer directly adjacent to this optical thin film are greater than or equal to 98%.

It is preferable that all transmittances at a Y value of an XYZ color system in a wavelength range of 440 nm to 460 nm, in a wavelength range of 525 nm to 545 nm, and in a wavelength range of 610 nm to 640 nm of a laminated body constituted of an optical thin film and a layer directly adjacent to this optical thin film are greater than or equal to 97%. It is more preferable that the transmittance at a Y value of an XYZ color system in a wavelength range of 525 nm to 545 nm of the laminated body constituted of an optical thin film and the layer directly adjacent to this optical thin film is greater than or equal to 98%. It is particularly preferable that all of the transmittances at a Y value of an XYZ color system in a wavelength range of 440 nm to 460 nm, in a wavelength range of 525 nm to 545 nm, and in a wavelength range of 610 nm to 640 nm of the laminated body constituted of an optical thin film and the layer directly adjacent to this optical thin film are greater than or equal to 98%.

In addition, it is preferable that, in the liquid crystal display device of the present invention, all transmittances at a Y value of an XYZ color system in a wavelength range of greater than 470 nm and less than 515 nm and in a wavelength range of greater than 555 nm and less than 600 nm of a laminated body constituted of an optical thin film and a layer directly adjacent to this optical thin film are less than 97%. It is more preferable that all transmittances at a Y value of an XYZ color system in a wavelength range of greater than 470 nm and less than 515 nm and in a wavelength range of greater than 555 nm and less than 600 nm of the laminated body constituted of an optical thin film and the layer directly adjacent to this optical thin film are less than or equal to 96%.

It is preferable that all transmittances at a Y value of an XYZ color system in a wavelength range of greater than 480 nm and less than 505 nm and in a wavelength range of greater than 565 nm and less than 590 nm of a laminated body constituted of an optical thin film and a layer directly adjacent to this optical thin film are less than 97%. It is more preferable that all transmittances at a Y value of an XYZ color system in a wavelength range of greater than 480 nm and less than 505 nm and in a wavelength range of greater than 565 nm and less than 590 nm of the laminated body constituted of an optical thin film and the layer directly adjacent to this optical thin film are less than or equal to 96%.

In the transmittance at a Y value of an XYZ color system, a value in which a Y value which is obtained by irradiating an optical film with light source light, which has been transmitted through a fluorescent material and a conversion member including QDOT, and measuring the transmitted light using a Spectroradiometer SR-3 (manufactured by TOPCON CORPORATION), is divided by a Y value which is measured using the Spectroradiometer SR-3 without passing the light through the optical film can be applied as a transmittance of a Y value. The Y value in this case is a value which can be calculated through an internal program of the Spectroradiometer SR-3.

$$L=K_m\int_{vis} S_t(\lambda)\bar{y}(\lambda)d\lambda$$

Specifically, Km is defined as a maximum luminous sensitivity (maximum luminous efficacy)
St(λ) is defined as a spectral energy density
y(λ) is defined as a color matching function of a green component In addition, transmittance wavelength dependency T(λ) of a film is measured using a Spectrophotometer V-550 (manufactured by JASCO Corporation) and spectral energy density Si(λ) of light which has been transmitted through the conversion member including QDOT is measured using a Spectroradiometer SR-3. It is also possible to calculate the transmittance of a Y value by obtaining a spectral energy density St(λ)=T(λ)×Si(λ) of the transmitted light of the film using the measured spectral energy density Si(λ). The above-described contents are disclosed on p. 19 of Manual of LCD Master of SYNTEC, INC.

—Optical Thin Film—

The optical thin film is a low refractive index layer in which the refractive index n (535) of the optical thin film at a wavelength of 535 nm is lower than the refractive index nu (535) of the layer directly adjacent to the optical thin film.

It is preferable that the refractive index n (535) of the optical thin film at a wavelength of 535 nm is 1.20 to 1.46. The refractive index n (535) of the optical thin film at a wavelength of 535 nm is more preferably 1.30 to 1.46 and still more preferably 1.32 to 1.38. It is possible to suppress reflectance, improve the light transmittance, and maintain the film intensity by setting the refractive index n (535) to be within the above-described ranges, which is preferable.

In the above-described optical thin film, the optical thickness which has been obtained by multiplying the refractive index by the film thickness satisfies any one of the following Expressions (2-1), (2-2), and (2-3).

$$1.15 \; \mu m \leq n(535) \times d \leq 1.25 \; \mu m \qquad \text{Expression (2-1)}$$

$$1.42 \; \mu m \leq n(535) \times d \leq 1.52 \; \mu m \qquad \text{Expression (2-2)}$$

$$1.69 \; \mu m \leq n(535) \times d \leq 1.79 \; \mu m \qquad \text{Expression (2-3)}$$

(In Expressions (2-1), (2-2), and (2-3), n (535) represents a refractive index of the optical thin film at a wavelength of 535 nm and d represents a thickness of the optical thin film (unit: μm).)

It is preferable that, in the liquid crystal display device of the present invention, the optical thin film satisfies any one of the following Expressions (2-1A), (2-2A), and (2-3A).

$$1.16 \; \mu m \leq n(535) \times d \leq 1.24 \; \mu m \qquad \text{Expression (2-1A)}$$

$$1.46 \; \mu m \leq n(535) \times d \leq 1.51 \; \mu m \qquad \text{Expression (2-2A)}$$

$$1.70 \; \mu m \leq n(535) \times d \leq 1.78 \; \mu m \qquad \text{Expression (2-3A)}$$

(In Expressions (2-1A), (2-2A), and (2-3A), n (535) represents a refractive index of the optical thin film at a wavelength of 535 nm and d represents a thickness of the optical thin film (unit: μm).)

In the liquid crystal display device of the present invention, it is preferable that the optical thin film satisfies the above-described Expression (2-2A).

The thickness d of the above-described optical thin film is not particularly limited as long as the thickness thereof satisfies the above-described ranges of the optical thickness, but is preferably 0.5 µm to 2 µm and more preferably 0.7 µm to 1.5 µm.

In a method for forming an optical thin film, it is possible to use a transparent thin film of an inorganic oxide through a chemical vapor deposition (CVD) method or a physical vapor deposition (PVD) method, and particularly, a vacuum deposition method or a sputtering method which is one kind of physical vapor deposition method, but it is preferable to use a method performed through all wet coating using a composition for an optical thin film.

The optical thin film is not particularly limited as long as the optical thin film is a layer within the above-described ranges of the refractive index, but it is possible to use a well-known constituent component, and specifically, it is possible to favorably use a composition which contains a fluorine-containing resin and inorganic fine particles and is disclosed in JP2007-298974A; and a hollow silica particle-containing low-refractive-index coating disclosed in JP2002-317152A, JP2003-202406A, and JP2003-292831A.

An optical film having scratch resistance and antifouling properties is preferable, and is used as an outermost layer forming an air interface. In order to improve the scratch resistance, provision of sliding properties on the surface using a material such as a silicone-containing compound which contains a silicone group or a fluorine-containing compound which contains fluorine is preferably performed.

Preferred examples of the above-described fluorine-containing compound include compounds disclosed in "0018" to "0026" in JP1997-222503A (JP-H9-222503A), "0019" to "0030" in JP1999-38202A (JP-H11-38202A), "0027" and "0028" in JP2001-40284A, JP2000-284102A, and the like.

As the above-described silicone-containing compound, a compound having polysiloxane structure is preferable, but it is also preferable to use a reactive silicone (for example, Silaplane (manufactured by CHISSO CORPORATION) or a polysiloxane containing a silanol group at both terminals (JP1999-258403A (JP-H11-258403A)). An organometallic compound such as a silane coupling agent, and a specific silane coupling agent containing a fluorine-containing hydrocarbon group may be cured through a condensation reaction under the coexistence of a catalyst (compounds disclosed in JP1983-142958A (JP-S58-142958A), JP1983-147483A (JP-S58-147483A), JP1983-147484A (JP-S58-147484A), JP1997-157582A (JP-H9-157582A), JP1999-106704A (JP-H11-106704A), JP2000-117902A, JP2001-48590A, and JP2002-53804A).

It is also possible to preferably make the optical thin film contain a filler (for example, a low-refractive index inorganic compound, such as silicon dioxide (silica), fluorine-containing particles (magnesium fluoride, calcium fluoride, and barium fluoride), of which a primary particle mean diameter is 1 nm to 150 nm; and organic fine particles disclosed in "0020" to "0038" in JP1999-3820A (JP-H11-3820A)), a silane coupling agent, a lubricant, a surfactant, or the like, as an additive other than the above.

—Substrate—

In the liquid crystal display device of the present invention, the substrate of the above-described polarizing plate protective film (the polarizing plate protective film on a side opposite to the liquid crystal cell) of the backlight side polarizing plate may be a layer directly adjacent to the optical thin film. In a case where the substrate is the layer directly adjacent to the optical thin film, the refractive index nu (535) of the substrate of the above-described polarizing plate protective film of the backlight side polarizing plate is preferably greater than 1.46 and less than or equal to 1.70, more preferably 1.47 to 1.60, particularly preferably 1.47 to 1.55, and more particularly preferably 1.47 to 1.50.

The material of the substrate is not particularly limited, and a well-known material can be used.

For the substrate, a thermoplastic resin excellent in transparency, mechanical strength, heat stability, moisture blocking properties, isotropy, and the like is used. Specific examples of such a thermoplastic resin include a cellulose ester resin, a polyester resin, a polyethersulfone resin, a polysulfone resin, a polycarbonate resin, a polyamide resin, a polyimide resin, a polyolefin resin, a (meth)acrylic resin, a cyclic polyolefin resin (norbornene resin), a polyarylate resin, a polystyrene resin, and a polyvinyl alcohol resin, and a mixture thereof. Among these, a cellulose ester resin, a polyester resin, and a (meth)acrylic resin are preferably as the substrate. That is, in the liquid crystal display device of the present invention, the substrate is preferably a cellulose acylate film, acrylic film, or a polyester film.

The cellulose ester resin is an ester of cellulose and a fatty acid. Specific examples of such a cellulose ester resin include triacetyl cellulose, diacetyl cellulose, tripropyl cellulose, and dipropyl cellulose. A preferred mode of the cellulose ester resin used for a retardation film is the same as that of cellulose acylate with a degree of substitution of acyl of 2.0 to 2.6 which is disclosed in JP2012-068661A, and the contents thereof are incorporated into the present invention.

As the polyester resin, polyethylene terephthalate and polyethylene naphthalate are preferable and polyethylene terephthalate is more preferable.

As the (meth)acrylic resin, an arbitrary (meta)acrylic resin can be appropriately employed within a range in which the effect of the present invention is not impaired. Examples thereof include a poly(meth)acrylic acid ester such as polymethyl methacrylate, a methyl methacrylate-(meth)acrylate copolymer, a methyl methacrylate-(meth)acrylic acid ester copolymer, a methyl methacrylate-acrylic ester-(meth)acrylic acid copolymer, a methyl (meth)acrylate-styrene copolymer (MS resin or the like), and a polymer having an alicyclic hydrocarbon group (for example, a methyl methacrylate-cyclohexyl methacrylate copolymer, or a methyl methacrylate-norbornyl (meth)acrylate copolymer). Preferred examples thereof include poly C1-6 alkyl (meth)acrylate such as polymethyl (meth)acrylate. More preferred examples thereof include a methyl methacrylate resin which has methyl methacrylate as a main component (50 mass % to 100 mass % and preferably 70 mass % to 100 mass %).

Specific examples of the (meth)acrylic resin include Acrypet VH or Acrypet VRL 20A manufactured by Mitsubishi Rayon Co., Ltd.; a (meth)acrylic resin having a ring structure within a molecule which is disclosed in JP2004-70296A; and a high Tg (meth)acrylic resin which is obtained through intramolecular cross-linking or an intramolecular cyclization reaction.

As the (meth)acrylic resin, it is possible to use a (meth)acrylic resin having a lactone ring structure. This is because the (meth)acrylic resin with a lactone ring structure has high heat resistance, high transparency, and high mechanical strength through biaxial stretching.

Examples of the (meth)acrylic resin with a lactone ring structure include (meth)acrylic resins with a lactone ring structure which are disclosed in JP2000-230016A, JP2001-151814A, JP2002-120326A, JP2002-254544A, JP2005-146084A, and the like.

Specific examples of cyclic polyolefin resin preferably include a norbornene resin. The cyclic olefin resin is a general term for a resin which is polymerized by having a cyclic olefin as a polymerization unit. Examples thereof include resins disclosed in JP1989-240517A (JP-H1-240517A), JP1991-14882A (JP-H3-14882A), and JP1991-122137A (JP-H3-122137A), and the like. Specific examples thereof include a ring-opened (co)polymer of a cyclic olefin; an addition polymer of a cyclic olefin; a cyclic olefin, a α-olefin such as ethylene and propylene, and a copolymer thereof (typically a random copolymer); a graft polymer in which these are modified by unsaturated carboxylic acid and derivatives thereof; and hydrides thereof. Specific examples of the cyclic olefin include a norbornene monomer.

As the cyclic polyolefin resin, various products are commercially available. Specific examples thereof include "ZEONEX" and "ZEONOR" which are trade names and are manufactured by ZEON CORPORATION, "ARTON" which is a trade name and is manufactured by JSR Corporation, "TOPAS" which is a trade name and is manufactured by Cleanese Corporation and "APEL" which is a trade name and is manufactured by Mitsui Chemicals, Inc.

The thickness of the polarizing plate protective film or the retardation film, which is to be described below, can be appropriately set. However, in general, the thickness thereof is about 1 μm to 500 μm in terms of working properties such as strength or handling, thin layer properties, or the like. Particularly, the thickness thereof is preferably 1 μm to 300 μm, more preferably 5 μm to 200 μm, particularly preferably 5 μm to 150 μm, and more particularly preferably 10 μm to 80 μm.

As a method for manufacturing a substrate, either a process of forming a polymeric film (above-described substrate) by casting a polymer solution containing a thermoplastic resin and a solvent, on a support, or a process of forming a substrate through melt film-forming of a thermoplastic resin can be used.

Furthermore, the above-described method for forming a substrate may include a process of stretching the above-described substrate (or a polymer film) in at least any of the machine direction and the transverse direction of a film.

—Backlight Side Polarizer—

In the liquid crystal display device of the present invention, the backlight side polarizer may be a layer directly adjacent to the optical thin film. In a case where the backlight side polarizer is the layer directly adjacent to the optical thin film, the preferred ranges of the refractive index of the backlight side polarizer are the same as the above-described preferred ranges of the refractive index of the substrate of the polarizing plate protective film of the backlight side polarizing plate.

The material of the polarizer is not particularly limited, and a well-known material can be used.

As the above-described polarizer, a polarizer in which iodine is adsorbed and aligned in a polymer film is preferably used. The above-described polymer film is not particularly limited and various polymer films can be used. Examples thereof include a polyvinyl alcohol-based film, a polyethylene terephthalate-based film, and an ethylene-vinyl acetate copolymer-based film, a partially saponified film, a hydrophilic polymer film such as a cellulose-based film, and a polyene-aligned film such as a dehydrated product of polyvinyl alcohol or a dehydrochlorinated product of polyvinyl chloride. Among these, it is preferable to use a polyvinyl alcohol-based film, which is excellent in dyeability using iodine, as a polarizer.

As the material of the above-described polyvinyl alcohol-based film, a polyvinyl alcohol or a derivative thereof is used. Examples of the derivative of a polyvinyl alcohol include a derivative which is modified by olefins such as ethylene and propylene; an unsaturated carboxylic acid such as acrylic acid, methacrylic acid, and crotonic acid and an alkyl ester thereof; acrylamide, and the like, in addition to polyvinyl formal, polyvinyl acetal, and the like.

The degree of polymerization of a polymer which is a material of the polymer film described above is generally 500 to 10,000, preferably within a range of 1000 to 6000, and more preferably within a range of 1400 to 4000. Furthermore, in a case of a saponified film, the degree of saponification thereof is, for example, in terms of solubility in water, preferably greater than or equal to 75 mol %, more preferably greater than or equal to 98 mol %, and still more preferably within a range of 98.3 mol % to 99.8 mol %.

The above-described polymer film (non-stretched film) is subjected to at least monoaxial stretching treatment and iodine-dying treatment in accordance with a usual method. Furthermore, the above-described polymer film can be subjected to boric acid treatment and cleaning treatment. In addition, the polymer film (stretched film) subjected to the above-described kinds of treatment becomes a polarizer by being subjected to drying treatment in accordance with a usual method.

The stretching method in the monoaxial stretching treatment is not particularly limited, and any method of wet stretching and dry stretching can be employed. Examples of stretching means of the dry stretching method include an inter-roll stretching method, a heating roll stretching method, and a compression stretching method. The stretching can be performed in multiple stages. In the above-described stretching means, the non-stretched film generally enters a heated state. The stretching ratio of the stretched film can be appropriately set depending on the purpose. However, it is desirable that the stretching ratio (total stretching ratio) thereof is about 2 times to 8 times, preferably 3 times to 7 times, and more preferably 3.5 times to 6.5 times.

The iodine-dying treatment is performed by, for example, immersing the polymer film in an iodine solution containing iodine and potassium iodide. In general, the iodine solution is an iodine aqueous solution and contains iodine, and potassium iodide as a dissolution aid. The concentration of iodine is about 0.01 mass % to 1 mass % and preferably 0.02 mass % to 0.5 mass %. The concentration of potassium iodide is about 0.01 mass % to 10 mass % and preferably 0.02 mass % to 8 mass %.

The temperature of the iodine solution during iodine-dying treatment is generally about 20° C. to 50° C. and preferably 25° C. to 40° C. The immersion time is generally about 10 seconds to 300 seconds and preferably within a range of 20 seconds to 240 seconds. The iodine content and the potassium content in the polymer film are adjusted to be within the above-described ranges by adjusting the conditions, such as concentration of the iodine solution and the temperature and time when immersing the polymer film in the iodine solution, during the iodine-dying treatment. The iodine-dying treatment may be performed at any stage before the monoaxial stretching treatment, during the monoaxial stretching treatment, and after the monoaxial stretching treatment.

When considering optical characteristics, the iodine content of the above-described polarizer is, for example, within a range of 2 mass % to 5 mass % and preferably within a range of 2 mass % to 4 mass %.

The above-described polarizer preferably contains potassium. The potassium content is preferably within a range of 0.2 mass % to 0.9 mass % and more preferably within a range of 0.5 mass % to 0.8 mass %. With the polarizer containing potassium, it is possible to obtain a polarizing film which has a preferred complex modulus of elasticity (Er) and a high degree of polarization. It is possible to make the polarizer contain potassium by, for example, immersing the polymer film, which is a material for forming the polarizer, in a solution containing potassium. A solution containing iodine may also serve as the above-described solution.

As the drying treatment process, it is possible to use a well-known conventional drying method such as natural drying, blast drying, and heat drying. For example, in the heat drying, the heating temperature is about 20° C. to 80° C., and the drying time is about 1 minute to 10 minutes. In addition, it is possible to appropriately stretch the film even in this drying treatment process.

The thickness of the polarizer is not particularly limited, and is generally 5 µm to 300 µm, preferably 10 µm to 200 µm, and more preferably 20 µm to 100 µm.

As the optical characteristics of the polarizer, the single body transmittance when being measured with a polarizer single body is preferably greater than or equal to 43% and more preferably within a range of 43.3% to 45.0%. In addition, the orthogonal transmittance, which is measured after preparing two sheets of the above-described polarizers and overlapping the two polarizers such that absorption axes thereof are at 90° to each other, is preferably small. Practically, the orthogonal transmittance is preferably 0.00% to 0.050% and more preferably less than or equal to 0.03%. The practical degree of polarization is preferably 99.90% to 100% and particularly preferably 99.93% to 100%. A polarizing plate from which almost the same optical characteristics as those of the polarizer when being measured in the polarizing plate are obtained is preferable.

—Luminance Improvement Film—

A luminance improvement film can be singly used or can be combined with a polarizing plate protective film, on the backlight unit side of the backlight side polarizing plate.

It is preferable that the liquid crystal display device of the present invention has a luminance improvement film between the backlight unit and the optical thin film.

It is preferable that, in the liquid crystal display device of the present invention, the luminance improvement film and the optical thin film are bonded to each other so as to have an air interface at least on a part of the surface of the optical thin film on the luminance improvement film side.

Examples of the luminance improvement film include a diffusion plate or a diffusion sheet, and a prism sheet which are well known, and a reflection type polarizing film to be described below, and a prism sheet is preferable.

The prism sheet is not particularly limited, and a well-known prism sheet can be used.

A commercially available prism sheet may be used. For example, it is preferable to use a brightness enhancement film (BEF), manufactured by 3M, or the like as a luminance improvement film.

The luminance improvement film which is a reflection type polarizing film has a function of separating out circular polarization or linear polarization, is disposed between the polarizing plate and a backlight, and backwardly reflects or diffuses either of the circular polarization or the linear polarization on the backlight side. Re-reflected light from the backlight portion partially changes the state of polarization, and is partially transmitted when being re-incident on the luminance improvement film and the polarizing plate. Therefore, the light utilization efficiency is improved and the forward luminance is improved to about 1.4 times by repeating this process. An anisotropic reflection-type luminance improvement film and an anisotropic diffusion-type luminance improvement film are known and any of these films can be combined with the backlight side polarizing plate in the present invention.

In the anisotropic reflection method, a luminance improvement film is known which has anisotropy of reflectance and transmittance due to laminating multiple monoaxial stretching films and non-stretched films and increasing the difference in refractive index in stretching directions. Moreover, multilayer film methods (disclosed in WO95/17691A, WO95/17692A, WO95/17699A) using a principle of a dielectric mirror or cholesteric liquid crystal methods (disclosed in EP606940A2 and JP1996-271731A (JP-H8-271731A)) are known. In the present invention, DBEF-E, DBEF-D, DBEF-M, and DBEF-P2 (all are manufactured by 3M) are preferably used as the multilayered type luminance improvement film using a principle of a dielectric mirror and NIPOCS (manufactured by NITTO DENKO CORPORATION) is preferably used as the cholesteric liquid crystal type luminance improvement film. Regarding NIPOCS, Nitto Technical Report, vol. 38, No. 1, May 2000, pp. 19 to 21 or the like can be referred to.

In addition, in the present invention, it is also preferable to use an anisotropic diffusion-type luminance improvement film, in which a positive intrinsic birefringence polymer and a negative intrinsic birefringence polymer are blended so as to be monoaxially stretched, and which is disclosed in each of WO97/32223A, WO97/32224A, WO97/32225A, WO97/32226A, JP1997-274108A (JP-H9-274108A), and JP1999-174231A (JP-H11-174231A), in combination. As the anisotropic diffusion-type luminance improvement film, DRPF-H (manufactured by 3M) is preferable.

In a case where the luminance improvement film and the optical thin film are bonded to each other so as to have an air interface at least on a part of the surface of the optical thin film on the luminance improvement film side, the thickness of the luminance improvement film is preferably 10 µm to 200 µm, more preferably 20 µm to 150 µm, and particularly preferably 30 µm to 120 µm.

In a case where the backlight side polarizing plate does not have the luminance improvement film, the thickness of this luminance improvement film is not particularly limited, and a well-known luminance improvement film can be used. But the thickness of the luminance improvement film is preferably 10 µm to 1000 µm, more preferably 10 µm to 500 µm, and particularly preferably 30 µm to 300 µm.

In addition, in the present invention, it is possible to apply the contents disclosed in JP2010-26454A to the present invention and the contents thereof are incorporated into the present invention.

(Retardation Film) In the above-described backlight side polarizing plate, a retardation film may be used as an inner-side polarizing plate protective film on a liquid crystal cell side.

Re (535) of the above-described retardation film is preferably 20 nm to 90 nm, more preferably 30 nm to 80 nm, and particularly preferably 40 nm to 70 nm.

The retardation Rth (535) of the above-described retardation film in the film thickness direction is preferably 80 nm to 170 nm, more preferably 90 nm to 160 nm, and particularly preferably 100 nm to 150 nm.

In measurement of Re and Rth of the retardation film, in a case where a thermoplastic resin used for the substrate of the retardation film is a cellulose ester, the retardation is measured by setting the average refractive index of the retardation film to 1.48.

The above-described Re and Rth can be adjusted depending on the type (the degree of substitution of a cellulose ester in a case where the thermoplastic resin used for the retardation film is, for example, a cellulose ester) of thermoplastic resin used for the above-described retardation film, the amount of thermoplastic resin and additives, addition of a retardation-increasing agent, the thickness of a film, the stretching direction of a film, the stretching ratio, and the like.

Preferred modes of an additive used for the retardation film are the same as those of a sugar ester compound, an additive of which the intrinsic birefringence is negative, a nitrogen-containing aromatic compound-based plasticizer, fine particles, and a retardation-increasing agent, which are disclosed in JP2012-068661A, and the contents thereof are incorporated into the present invention.

A preferred mode of the method for manufacturing a retardation film is the same as that of the method for manufacturing a cellulose acylate film disclosed in JP2012-068661A, and the contents in JP2012-068661A are incorporated into the present invention.

(Adhesive Layer)

When bonding the above-described polarizer to a substrate of a polarizing plate protective film or a retardation film, it is possible to appropriately employ an adhesive agent, an agglutinant, or the like in accordance with the polarizer and the polarizing plate protective film or the retardation film. In addition, when bonding an optical thin film to a luminance improvement film, it is possible to appropriately employ an adhesive agent, an agglutinant, or the like in accordance with the optical thin film and the luminance improvement film. The adhesive agent and the bonding treatment method are not particularly limited. However, the bonding treatment method can be performed using, for example, an adhesive agent formed of a vinyl polymer or an adhesive agent formed of at least boric acid or borax, glutaraldehyde or melamine, and a water soluble cross-linking agent of a vinyl alcohol polymer such as oxalic acid. An adhesive layer formed of such an adhesive agent can be formed as a dry layer or the like coated with an aqueous solution. When preparing the aqueous solution, it is also possible to formulate a cross-linking agent, another additive, or a catalyst of an acid in the aqueous solution as necessary. Particularly when using a polyvinyl alcohol-based polymer film as a polarizer, it is preferable to use an adhesive agent containing a polyvinyl alcohol-based resin in terms of adhesiveness. Furthermore, an adhesive agent containing a polyvinyl alcohol-based resin having an acetoacetyl group is more preferable in terms of improving durability.

The above-described polyvinyl alcohol-based resin is not particularly limited, but the polyvinyl alcohol-based resin preferably has an average degree of polymerization of about 100 to 3000 and an average degree of saponification of about 85 mol % to 100 mol % in terms of adhesiveness. In addition, the concentration of the aqueous adhesive solution is not particularly limited, but is preferably 0.1 mass % to 15 mass % and more preferably 0.5 mass % to 10 mass %. The thickness of the above-described adhesive layer after drying is preferably about 30 nm to 1000 nm and more preferably 50 nm to 300 nm. If the thickness thereof is too thin, an adhesive strength becomes insufficient and if the thickness thereof is too thick, there is a high probability that a problem will occur in the appearance.

As other adhesive agents, it is possible to use a thermosetting resin or an ultraviolet-curing type resin such as a (meth)acrylic-based resin, a urethane-based resin, an acrylic urethane-based resin, an epoxy-based resin, or a silicone-based resin.

<Display Side Polarizing Plate>

It is preferable that the display side polarizing plate possessed by the liquid crystal display device of the present invention has a polarizer.

It is preferable that an outer-side polarizing plate protective film is provided on the surface on a side far from the liquid crystal cell on the basis of the polarizer.

An inner-side polarizing plate protective film may be provided on a side close to the liquid crystal cell on the basis of the polarizer.

A preferred mode of the polarizer included in the display side polarizing plate is the same as that of the backlight side polarizer.

For the polarizing plate protective films of the display side polarizing plate, a thermoplastic resin which is excellent in transparency, mechanical strength, heat stability, moisture blocking properties, isotropy, and the like. Specific examples of such a thermoplastic resin include the thermoplastic resins exemplified for the above-described substrate of the backlight side polarizing plate protective film of the backlight side polarizing plate. Among these, a cellulose resin is preferable and triacetyl cellulose is particularly preferable. Many products are commercially available for triacetyl cellulose, and therefore, there is an advantage in terms of easiness in acquisition or cost. Examples of commercially available products of triacetyl cellulose include "UV-50", "UV-80", "SH-80", "TD-80U", "TD-TAC", "UZ-TAC", and "TD60UL" which are trade names and are manufactured by FUJIFILM Corporation or "KC series" manufactured by Konica Minolta, Inc.

The polarizing plate protective film on the liquid crystal cell side out of the polarizing plate protective films of the display side polarizing plate may be a retardation film.

<Backlight Unit>

In the liquid crystal display device of the present invention, the backlight unit emits blue light which has a light emission center wavelength in a wavelength range of 430 nm to 480 nm and has a peak of light emission intensity with a FWHM of less than or equal to 100 nm; green light which has a light emission center wavelength in a wavelength range of 500 nm to 600 nm and has a peak of light emission intensity with a FWHM of less than or equal to 100 nm; and red light which has a light emission center wavelength in a wavelength range of 600 nm to 650 nm and has a peak of light emission intensity with a FWHM of less than or equal to 100 rm.

The wavelength range of the above-described blue light emitted by the above-described backlight unit is preferably 450 nm to 480 nm and more preferably 460 nm to 470 nm.

The wavelength range of the above-described green light emitted by the above-described backlight unit is preferably 520 nm to 550 nm and more preferably 530 nm to 540 nm.

The wavelength range of the above-described red light emitted by the above-described backlight unit is preferably 610 nm to 650 nm and more preferably 620 nm to 640 nm.

As the configuration of the backlight unit, an edge light mode, which has a light guiding plate, a reflective plate, or the like as a constituent member, or a direct backlight mode may be used. However, it is preferable that the backlight unit includes a reflective member in a rear portion of a light source. Such a reflective member is not particularly limited and well-known reflective members, which are disclosed in JP3416302B, JP3363565B, JP4091978B, JP3448626B, and the like, can be used, and the contents thereof are incorporated into the present invention.

In the liquid crystal display device of the present invention, all FWHMs at light emission intensities of the above-described blue light, green light, and red light which are emitted by the above-described backlight unit are preferably less than or equal to 80 nm, more preferably less than or equal to 50 nm, particularly preferably less than or equal to 45 nm, and more particularly preferably less than or equal to 40 nm. Among these, the FWHM at each light emission intensity of the above-described blue light is still more particularly preferably less than or equal to 30 nm.

A preferred mode satisfying such a mode is not particularly limited, but in the present invention, the light source of the backlight unit preferably has a fluorescent material which emits the above-described green light and the above-described red light when a blue light-emitting diode emitting the above-described blue light and the above-described blue light of the above-described blue light-emitting diode are incident. A mode may be employed in which the above-described backlight unit has a blue laser emitting the above-described blue light, a green laser emitting the above-described green light, and a red laser emitting the above-described red light.

As the light source of the backlight unit, a blue light-emitting diode emitting the above-described blue light, a green light-emitting diode emitting the above-described green light, and a red light-emitting diode emitting the above-described red light may be used.

In addition, a quantum dot member in which the backlight unit emits the above-described blue light, the above-described green light, and the above-described red light when an ultraviolet light-emitting diode emitting ultraviolet light and the above-described ultraviolet light of the above-described ultraviolet light-emitting diode are incident.

As the fluorescent material, there is an yttrium-aluminum-garnet-based yellow fluorescent body, a terbium-aluminum-garnet-based yellow fluorescent body, a quantum dot, and the like. The fluorescent wavelength of the fluorescent material can be controlled by changing the particle diameter of the fluorescent body.

In the liquid crystal display device of the present invention, the fluorescent material, which emits the above-described green light and the above-described red light when a blue light-emitting diode emitting the above-described blue light and the above-described blue light of the above-described blue light-emitting diode are incident, is a quantum dot member (for example, a quantum dot sheet or a quantum dot bar with a bar shape). It is preferable that the quantum dot member is disposed between an optical sheet member and a blue light source. Such a quantum dot member is not particularly limited and well-known quantum dot members can be used. For example, well-known quantum dot members are disclosed in JP2012-169271A, SID'12 DIGEST, p. 895, and the like, and the contents thereof are incorporated into the present invention. In addition, as such a quantum dot sheet, it is possible to use a quantum dot enhancement film (QDEF, manufactured by NanoSys, INC).

In the liquid crystal display device of the present invention, it is preferable that the backlight unit has a wavelength selection filter for blue which selectively transmits light at a wavelength shorter than 460 nm from the above-described blue light.

In the liquid crystal display device of the present invention, it is preferable that the backlight unit has a wavelength selection filter for red which selectively transmits light at a wavelength longer than 630 nm from the above-described red light.

Such wavelength selection filters for blue and for red are not particularly limited, and well-known wavelength selection filters can be used. Well-known wavelength selection filters are disclosed in JP2008-52067A, and the contents thereof are incorporated into the present invention.

In addition, it is preferable that the backlight unit is also provided with a diffusion plate or a diffusion sheet, a prism sheet (for example, BEF), and a light guiding device which are well known. Other members are also disclosed in JP3416302B, JP3363565B, JP4091978B, JP3448626B, and the like, and the contents thereof are incorporated into the present invention.

<Liquid Crystal Cell>

The configuration of the liquid crystal cell is not particularly limited and a liquid crystal cell with a general configuration can be employed. The liquid crystal cell may include, for example, a pair of substrates which are disposed so as to face to each other and a liquid crystal layer which is interposed between these pair of substrates, and may also include a color filter layer or the like as necessary. The driving mode of the liquid crystal cell is not particularly limited, and various modes such as twisted nematic (TN), super twisted nematic (STN), vertical alignment (VA), in-plane switching (IPS), an optically compensated bend cell (OCB), and the like can be used.

The liquid crystal cell used for the liquid crystal display device of the present invention is preferably a VA mode, an OCB mode, an IPS mode or a TN mode, but is not limited thereto.

In a liquid crystal cell of a TN mode, rod-like liquid crystal molecules are substantially aligned horizontally when no voltage is applied, and are twist-aligned at 60° to 120°. The liquid crystal cell of the TN mode is most frequently used as a color TFT liquid crystal display device, and is disclosed in many documents.

In a liquid crystal cell of a VA mode, rod-like liquid crystalline molecules are substantially aligned vertically when no voltage is applied. In the liquid crystal cell of the VA mode, (2) a liquid crystal cell (of an MVA mode) (disclosed in SID97, Digest of tech. Papers (proceedings) 28 (1997) 845) in which the VA mode is turned into a multi-domain state for enlarging a view angle; (3) a liquid crystal cell (disclosed in Proceedings 58 and 59 (1998) of the Japan Liquid Crystal Society) of a mode (n-ASM mode) in which rod-like liquid crystalline molecules are substantially aligned vertically, when no voltage is applied, and are twisted and aligned in a multi-domain state when a voltage is applied; and (4) a liquid crystal cell (announced in LCD International 98) of a SURVIVAL mode are included in addition to (1) a liquid crystal cell (disclosed in JP1990-176625A (JP-H2-176625A)) of a VA mode in a narrow sense in which rod-like liquid crystalline molecules are substantially aligned vertically, when no voltage is applied, and are substantially aligned horizontally when a voltage is applied. In addition, any patterned vertical alignment (PVA) type, optical alignment type, and polymer-sustained alignment (PSA) type may be used. For the details of these modes, there are detailed disclosures in JP2006-215326A and JP2008-538819A.

In a liquid crystal cell of an IPS mode, rod-like liquid crystal molecules are substantially aligned in parallel to the substrate, and liquid crystal particles respond in a planar manner by applying a parallel electric field to the substrate surface. The ISP mode displays black in a state in which no electric field is applied, and absorption axes of a pair of upper and lower polarizing plates are orthogonal to each other. A method for improving the view angle by decreasing light which leaks while displaying black in an oblique direction, using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

It is preferable that an embodiment of the liquid crystal display device has a liquid crystal cell, in which a liquid crystal layer is interposed between substrates which are opposed to each other and of which at least one is provided with an electrode, and this liquid crystal cell is configured to be disposed between two sheets of polarizing plates. The liquid crystal display device has a liquid crystal cell, in which a liquid crystal is sealed between upper and lower substrates, and displays an image by changing the alignment state of the liquid crystal through voltage application. The liquid crystal display device further has a polarizing plate protective film or an optical compensation member which performs optical compensation as necessary, and a subordinate functional layer such as an adhesive layer. In addition, the liquid crystal display device of the present invention may include other members. For example, a forward scattering layer, a primer layer, an antistatic layer, and a surface layer such as an undercoat layer, are disposed together with (or instead of) a color filter substrate, a thin layer transistor substrate, a lens film, a diffusion sheet, a hard coat layer, an anti-reflection layer, a low reflection layer, and an anti-glare layer.

<Other Configurations>

(Color Filter)

Pixels in the present invention can be formed through various well-known methods as RGB pixel formation methods in a case of using the above-described blue light at less than or equal to 500 nm as a light source. For example, it is possible to form a predetermined black matrix and pixel patterns of R, G, and B on a glass substrate using a photo mask and photoresist. In addition, it is possible to produce a color filter, which is formed of patterns of R, G, and B using coloring ink for pixels of R, G, and B and ejects an ink composition to the inside of a region (a concave section surrounded by a convex section) divided by a black matrix with a predetermined width, and a black matrix which has a width wider than that of the above-described black matrix at every one of n intervals, until the concentration of the ink composition becomes a predetermined concentration using an inkjet-type printing device. After coloring an image, each of the pixels and the black matrixes may be completely cured through baking or the like.

Preferred characteristics of the color filter are disclosed in JP2008-083611A, and the contents thereof are incorporated into the present invention.

For example, it is preferable that one wavelength which has a transmittance of a half of the maximum transmittance in the color filter displaying green is 590 nm to 610 nm and the other is 470 nm to 500 nm. In addition, it is preferable that one wavelength which has a transmittance half of the above-described maximum transmittance in the color filter showing green is 590 nm to 600 nm. Furthermore, it is preferable that the maximum transmittance in the color filter showing green is greater than or equal to 80%. It is preferable that the wavelength which has the maximum transmittance in the color filter showing green is 530 nm to 560 nm.

In the above-described color filter showing green, the transmittance at a wavelength of the above-described light emission peak is preferably less than or equal to 10% of the maximum transmittance.

In the above-described color filter showing red, the transmittance at 580 nm to 590 nm is preferably less than or equal to 10% of the maximum transmittance.

As a pigment for a color filter, in blue, a complementary color pigment C.I. Pigment Violet 23 is used for C.I. Pigment Blue 15:6. In red, C.I. Pigment Yellow 139 is used as a complementary color for C.I. Pigment Red 254. In general, C.I. Pigment Yellow 150, C.I. Pigment Yellow 138, or the like as a pigment for a complementary color is used for C.I. Pigment Green 36 (copper bromide-phthalocyanine green), or C.I. Pigment Green 7 (copper chloride-phthalocyanine green) as a pigment for green. It is possible to control a spectrum by adjusting the composition of these pigments. It is possible to set the half-width wavelength on a long wavelength side by decreasing or increasing the amount of the composition of the complementary pigments with respect to comparative examples, to be within a range of 590 nm to 600 nm. Currently, pigments are generally used. However, a color filter with dyes may be used as long as the dyes are pigments which can control a spectrum and secure process stability and reliability.

(Black Matrix)

In the liquid crystal display device of the present invention, a black matrix is preferably disposed between pixels. Examples of the material forming a black stripe include a material using a sputtered film of metal such as chromium, and a light-shielding photosensitive composition in which a light-shielding resin, a black coloring agent, and the like are combined. Specific examples include carbon black, titanium carbon, iron oxide, titanium oxide, and graphite, and among these, carbon black is preferable.

(Thin Film Transistor)

It is preferable that the liquid crystal display device of the present invention further has a TFT substrate having a thin film transistor (hereinafter, also referred to as a TFT).

It is preferable that the above-described thin film transistor has an oxide semiconductor film in which the carrier concentration is less than $1 \times 10^{14}/cm^3$. A preferred mode of the above-described thin film transistor is disclosed in JP2011-141522A, and the contents thereof are incorporated into the present invention.

EXAMPLES

Hereinafter, the present invention will be described in detail based on Examples. Materials, reagents, the amount of substances, the proportion thereof, the operation thereof, which are shown in the following Examples, can be appropriately changed within the scope not departing from the gist of the present invention. Accordingly, the present invention is not limited and restricted to the following Examples.

Example 1

<Manufacture of Laminated Body which is Constituted of Optical Thin Film and Layer Directly Adjacent to Optical Thin Film and is Used as Backlight Side Polarizing Plate Protective Film of Backlight Side Polarizing Plate>

(Synthesis of Perfluoroolefin Copolymer P-1)

A perfluoroolefin copolymer P-1 was prepared through the same method as that of a perfluoroolefin copolymer (1) disclosed in JP2010-152311A. The refractive index of the obtained polymer was 1.422.

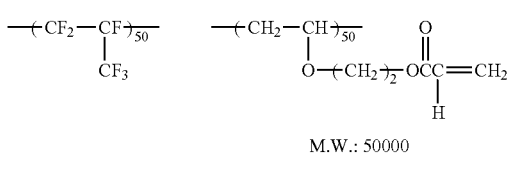

M.W.: 50000

Perfluoroolefin Copolymer (P-1)

In the above-described structural formula, 50:50 represents a molar ratio.

(Preparation of Hollow Silica Dispersion Liquid A-1)

A hollow silica particle dispersion liquid A-1 (concentration of solid contents: 18.2 mass %) with an average particle diameter of 60 nm, a shell thickness of 10 nm, and a refractive index of 1.31 of silica particles was prepared by adjusting the conditions through the same method as that of a dispersion liquid A-1 disclosed in JP2007-298974A.

(Preparation of Low Refractive Index-Forming Composition A-1)

The following composition was put into a mixing tank and was stirred to make a low refractive index layer-forming composition A-1 (concentration of solid contents: 12.5 mass %).

| | |
|---|---|
| Perfluoroolefin copolymer P-1 | 14.8 parts by mass |
| Ethyl methyl ketone | 157.7 parts by mass |
| DPHA | 3.0 parts by mass |
| Hollow silica particle dispersion liquid A-1 | 21.2 parts by mass |
| Irgacure 127 | 1.3 parts by mass |
| X22-164C | 2.1 parts by mass |

Compounds used are shown below.

DPHA: Mixture (manufactured by Nippon Kayaku Co., Ltd.) of dipentaerythritol pentaacrylate and dipentaerythritol hexaacrylate Irgacure 127: Photopolymerization initiator (manufactured by Ciba Specialty Chemicals Inc.)

X22-164C: Reactive Silicone (manufactured by Shin-Etsu Chemical Co., Ltd.)

(Manufacture of Optical Thin Film)

The surface of a substrate (hereinafter, also referred to as a TAC substrate) of a cellulose triacetate film (Fujitac TD80UF: manufactured by FUJIFILM Corporation) with a refractive index of 1.48 at a wavelength of 535 nm which is commercially available, was coated with the low refractive index layer-forming composition A-1, which had been prepared in this manner and had a refractive index n=1.36 at a wavelength of 535 nm, at a film thickness d denoted in the following Table 1, using a gravure coater. The drying conditions were set to 90° C. and 30 seconds and the illuminance was set to 600 mW/cm² and the irradiation amount was set to 600 mJ/cm² using a 240 W/cm air-cooled metal halide lamp (manufactured by EYE GRAPHICS Co., Ltd.) while performing nitrogen purging so as to create an atmosphere in which the oxygen concentration was less than or equal to 0.1 volume % for the ultraviolet curing conditions. The film thickness of the optical thin film was set to a value (885 nm in Example 1) denoted in the following Table 1.

The obtained laminated body constituted of the optical thin film and the layer directly adjacent to the optical thin film was set as an optical film of Example 1.

The optical film of Example 1 was used as a backlight side polarizing plate protective film of a backlight side polarizing plate. The layer adjacent to the optical thin film corresponds to a PET substrate.

<Manufacture of Backlight Side Polarizing Plate>

A polarizer was manufactured in the same manner as in "0219" to "0220" in JP2006-293275A.

A commercially available cellulose triacetate film (Fujitac TD80UF: manufactured by FUJIFILM Corporation) as an (inner-side) polarizing plate protective film on a front side of a backlight side polarizing plate was subjected to saponification treatment, and was then bonded to one side of a polarizer as a protective film using a polyvinyl alcohol-based adhesive. In addition, the laminated body (optical film of Example 1) which was constituted of the optical thin film and the layer directly adjacent to the optical thin film and was obtained in the above was subjected to saponification treatment, and was then bonded to the other side of the polarizer as a protective film using a polyvinyl alcohol-based adhesive, to manufacture a polarizing plate.

The obtained polarizing plate was set as a polarizing plate of Example 1.

<Manufacture of Liquid Crystal Display Device>

A commercially available liquid crystal display device (trade name of KDL 46W900A manufactured by Sony Corporation) was disassembled, a backlight side polarizing plate was exchanged with the polarizing plate of Example 1 which had been produced as above, and a backlight unit was exchanged with the following RGB narrow-band backlight unit, to produce a liquid crystal display device of Example 1.

The RGB narrow-band backlight unit used was provided with a blue light-emitting diode (B-LED used in KDL 46W900A at a dominant wavelength of 450 nm and a FWHM of 20 nm) as a light source. In addition, the RGB narrow-band backlight unit was also provided with a quantum dot member which emitted fluorescence including green light at a center wavelength of 535 nm and a FWHM of 40 nm and red light at a center wavelength of 630 nm and a FWHM of 40 nm when blue light of the blue light-emitting diode was incident on a front portion of a light source. In addition, the RGB narrow-band backlight unit was provided with a reflective member, which converted and reflected light in the state of polarization which was emitted from the light source and was reflected by the above-described optical sheet member, in a rear portion of the light source.

Comparative Example 1

A liquid crystal display device of Comparative Example 1 was manufactured in the same manner as in Example 1 except that the commercially available cellulose triacetate film (Fujitac TD80UF: manufactured by FUJIFILM Corporation) was used as a rear-side (outer-side) polarizing plate protective film instead of the laminated body (optical film of Example 1) constituted of an optical thin film and a layer directly adjacent to the optical thin film when manufacturing a backlight side polarizing plate in Example 1.

Examples 2 to 9 and Comparative Examples 2 to 7

Optical films, polarizing plates, and liquid crystal display devices of Examples 2 to 9, and Comparative Examples 2 to 7 were produced in the same manner as in Example 1 except that the coating thicknesses of the optical films when manufacturing the backlight side polarizing plate in Example 1 were respectively changed to the thicknesses denoted in the following Table 1.

Example 10

<Manufacture of Backlight Side Polarizing Plate and Luminance Improvement Film>

The coating thickness of the optical thin film when manufacturing the backlight side polarizing plate in Example 1 was changed to the thickness denoted in the following Table 1, and the portion of a peak of a prism of a brightness enhancement film (BEF: manufactured by 3M) which was known as a luminance improvement film was stacked on the laminated body constituted of an optical thin film and a layer directly adjacent to the optical thin film, and only a tip portion of the peak was bonded thereto using an acrylic adhesive. At this time, the above-described luminance improvement film and the above-described optical thin film were bonded to each other so as to have an air interface at least in a part of the surface on the above-described luminance improvement film of the above-described optical thin film.

The obtained laminated body constituted of the luminance improvement film, the optical thin film, and the layer directly adjacent to the optical thin film was set as an optical film of Example 10.

<Manufacture of Polarizing Plate and Liquid Crystal Display Device>

A polarizing plate and a liquid crystal display device of Example 10 were manufactured in the same manner as in Example 1 except that a backlight side polarizing plate (in which the optical film of Example 10 was provided as a backlight side polarizing plate protective film of the backlight side polarizing plate) with the luminance improvement film manufactured in this manner was used instead of the backlight side polarizing plate in manufacturing the polarizing plate and the liquid crystal display device of Example 1.

Comparative Example 11

<Manufacture of Backlight Side Polarizing Plate>
(Manufacture of Acrylic Substrate)

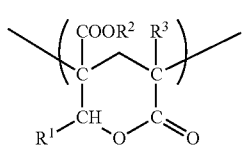

General Formula (1)

A (meth)acrylic resin sheet which had a lactone ring structure was obtained by supplying a biaxial extruder with pellets of [a mixture of 90 parts by mass of a (meth)acrylic resin {copolymerization monomer mass ratio=methyl methacrylate/2-(hydroxymethyl) methyl acrylate=8/2, a lactone ring formation ratio of about 100%, a content ratio of a lactone ring structure 19.4%, a mass-average molecular weight of 133000, a melt flow rate of 6.5 g/10 minutes (240° C., 10 kgf), Tg 131° C.} which had a lactone ring structure, in which, in the above-described General Formula (1), $R^1$ represents a hydrogen atom, and $R^2$ and $R^3$ are methyl groups, and 10 parts by mass of an acrylonitrilestyrene (AS) resin {TOYO AS AS20, manufactured by TOYO-STYRENE CO., LTD.}; Tg 127° C.], and subjecting the pellets to melt extrusion to have a sheet shape at about 280° C. An acrylic substrate (thickness: 61 μm, in-plane phase difference Re: 0.8 nm, thickness direction phase difference Rth: 1.8 nm) was obtained by stretching this non-stretched sheet longitudinally and horizontally under the condition of a temperature of 160° C.

<Manufacture of Liquid Crystal Display Device>

A liquid crystal display device of Comparative Example 11 was manufactured in the same manner as in Comparative Example 1 except that the acrylic substrate which had been manufactured described above was used as a rear-side (outer-side) polarizing plate protective film instead of the commercially available cellulose triacetate film when manufacturing the backlight side polarizing plate in Comparative Example 1.

Example 17

<Manufacture of Optical Film and Backlight Side Polarizing Plate>

An optical film and a backlight side polarizing plate of Example 17 were manufactured in the same manner as in Example 1 except that the acrylic substrate which had been manufactured as described above was used instead of the TAC substrate when manufacturing the laminated body constituted of an optical thin film and a layer directly adjacent to the optical thin film, and the coating thickness of the optical thin film was changed to the thickness denoted in the following Table 1, when manufacturing the backlight side polarizing plate in Example 1.

<Manufacture of Liquid Crystal Display Device>

A liquid crystal display device of Example 17 was manufactured in the same manner as in Example 1 except that a backlight side polarizing plate including the acrylic substrate which had been manufactured as described above was used instead of the backlight side polarizing plate used in Example 1 in manufacturing the liquid crystal display device of Example 1.

Comparative Example 21

<Manufacture of Backlight Side Polarizing Plate>
(Manufacture of PET Substrate)

Polyethylene terephthalate was synthesized through a usual method. This was used as polyester A.

The chip material of polyester A was dried in a Henschel mixer and a paddle dryer at a moisture content of less than or equal to 50 ppm. Then, an ultraviolet absorber (following Compound (1)) was kneaded into polyester A which is a raw material so as to form chips and was blended with the chips of polyester A. The amount of the above-described ultraviolet absorber was adjusted so as to become 0.4 mass % with respect to the whole polyester. These chip materials were dried in a Henschel mixer and a paddle dryer at a moisture content of less than or equal to 50 ppm, and then were melted in an extruder in which the temperature of a heater was set to 280° C. to 300° C. An amorphous base was obtained by ejecting the melted polyester on a chiller roll to which static electricity was applied by a die portion. A 100 μm polyester film was obtained by stretching this amorphous base in a TD direction. There was no bleeding out of the ultraviolet absorber of the obtained polyester film which was observed. This film was set as a PET substrate. The slow axis direction of this film was within a range of ±5° of a longitudinal direction and a vertical direction of the film.

Compound (1)

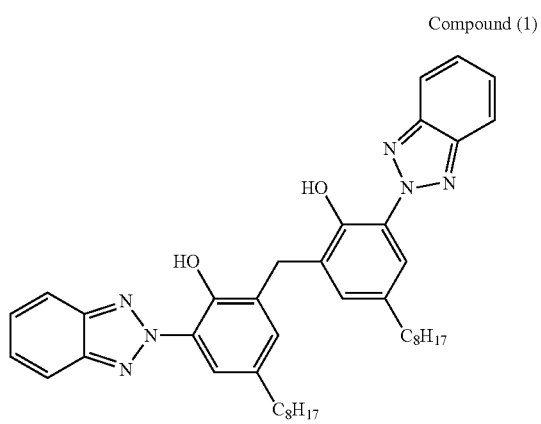

<Manufacture of Liquid Crystal Display Device>

A liquid crystal display device of Comparative Example 21 was manufactured in the same manner as in Comparative Example 1 except that the PET substrate which had been manufactured as described above was used as a rear-side (outer-side) polarizing plate protective film instead of the commercially available cellulose triacetate film when manufacturing the backlight side polarizing plate in Comparative Example 1.

Example 27

<Manufacture of Optical Film and Backlight Side Polarizing Plate>

An optical film and a backlight side polarizing plate of Example 27 were manufactured in the same manner as in Example 1 except that the PET substrate which had been manufactured as described above was used instead of the TAC substrate when manufacturing the laminated body constituted of an optical thin film and a layer directly adjacent to the optical thin film, and the coating thickness of the optical thin film was changed to the thickness denoted in the following Table 1, when manufacturing the backlight side polarizing plate in Example 1.

<Manufacture of Liquid Crystal Display Device>

A liquid crystal display device of Example 27 was manufactured in the same manner as in Example 1 except that a backlight side polarizing plate including the PET substrate which had been manufactured as described above was used instead of the backlight side polarizing plate used in Example 1 in manufacturing the liquid crystal display device of Example 1.

[Evaluation]

The liquid crystal display devices of Examples and Comparative Examples were evaluated in accordance with the following criteria.

(1) Wavelength Dependency of Transmittance of Optical Thin Film and Layer Directly Adjacent to Optical Thin Film Measurement of the transmittance of each laminated body constituted of an optical thin film and a layer directly adjacent to the optical thin film (hereinafter, also referred to as a sample film) included in each of the liquid crystal display devices of Examples and Comparative Examples was performed in a wavelength range of visible light of 380 nm to 780 nm using a Spectrophotometer V-550 (manufactured by JASCO Corporation). However, in this measurement, it is desirable to measure the transmittance on an air interface side, that is, an optical thin film side of the sample film. Accordingly, the transmittance was measured by preparing two sheets of the sample film, bringing the surfaces on a side opposite to the optical thin film into close contact with each other using refractive index-matching oil, and making both the surfaces become optical thin film sides. Then, the transmittance of the measured value was converted (the square root of the entirety was taken) to a transmittance of only an optical thin film of one surface which was regarded as a transmittance of a sample film.

The results of the transmittance of sample films at five kinds of wavelength denoted in the following Table 1 are shown in the following Table 1.

(2) Evaluation of Liquid Crystal Display Device

The transmittance of a liquid crystal display device in each of Examples and Comparative Examples was measured. The measurement of the transmittance was performed over wavelengths of the entire visible light region wavelength using a Spectrophotometer V-550 (manufactured by JASCO Corporation). The transmittance in the LCD performance was regarded as a transmittance at a Y value of an XYZ color system.

Regarding the obtained transmittance, on the basis of the transmittance of the liquid crystal display device of Comparative Example 1, the increase in the transmittance of liquid crystal display devices of other Comparative Examples and Examples was calculated based on the following Expression.

(Increase in transmittance of liquid crystal display devices of other Comparative Examples and Examples)=100%×{(transmittance of liquid crystal display devices of other Comparative Examples and Examples)−(transmittance of liquid crystal display device of Comparative Example 1)}/(transmittance of liquid crystal display device of Comparative Example 1)   Expression In addition, the color reproducibility region of a liquid crystal display device was measured through a method disclosed in "0066" of JP2012-3073A. It is expected that the NTSC ratio of the color reproducibility region should be practically greater than or equal to 72%, preferably greater than 72%, and more preferably 100%.

The obtained results are denoted in the following Table 1.

TABLE 1

| | Optical film | | | | | | | |
|---|---|---|---|---|---|---|---|---|
| | Optical thin film | | | Layer adjacent to optical thin film (substrate or polarizer) | | Wavelength dependency of transmittance of only optical film | | |
| | Refractive index n(535) | Thickness d(μm) | n(535) × d | Type | Refractive index nu(535) | 450 nm | 493 nm | 535 nm |
| Comparative Example 1 | None | None | None | TAC substrate | 1.48 | 96% | 96% | 96% |

TABLE 1-continued

| | | | | | | | | |
|---|---|---|---|---|---|---|---|---|
| Comparative Example 2 | 1.36 | 0.885 | 1.204 | TAC substrate | 1.48 | 97% | 96% | 98% |
| Comparative Example 3 | 1.36 | 1.082 | 1.471 | TAC substrate | 1.48 | 98% | 96% | 98% |
| Comparative Example 8 | 1.36 | 1.279 | 1.739 | TAC substrate | 1.48 | 97% | 96% | 98% |
| Example 1 | 1.36 | 0.846 | 1.15 | TAC substrate | 1.48 | 97% | 96% | 97% |
| Example 2 | 1.36 | 0.885 | 1.204 | TAC substrate | 1.48 | 97% | 96% | 98% |
| Example 3 | 1.36 | 0.919 | 1.25 | TAC substrate | 1.48 | 97% | 96% | 97% |
| Example 4 | 1.36 | 1.066 | 1.45 | TAC substrate | 1.48 | 97% | 96% | 97% |
| Example 5 | 1.36 | 1.082 | 1.471 | TAC substrate | 1.48 | 98% | 96% | 98% |
| Example 6 | 1.36 | 1.118 | 1.52 | TAC substrate | 1.48 | 97% | 96% | 97% |
| Example 7 | 1.36 | 1.243 | 1.69 | TAC substrate | 1.48 | 97% | 96% | 97% |
| Example 8 | 1.36 | 1.279 | 1.739 | TAC substrate | 1.48 | 97% | 96% | 98% |
| Example 9 | 1.36 | 1.316 | 1.79 | TAC substrate | 1.48 | 97% | 96% | 97% |
| Comparative Example 4 | 1.36 | 0.809 | 1.1 | TAC substrate | 1.48 | 96% | 97% | 96% |
| Comparative Example 5 | 1.36 | 0.993 | 1.35 | TAC substrate | 1.48 | 96% | 98% | 96% |
| Comparative Example 6 | 1.36 | 1.180 | 1.605 | TAC substrate | 1.48 | 96% | 98% | 96% |
| Comparative Example 7 | 1.36 | 1.354 | 1.84 | TAC substrate | 1.48 | 96% | 97% | 96% |
| Example 10 | 1.36 | 1.082 | 1.471 | TAC substrate | 1.48 | 98% | 96% | 98% |
| Comparative Example 11 | None | None | None | Acrylic substrate | 1.49 | 96% | 96% | 96% |
| Example 17 | 1.36 | 1.082 | 1.471 | Acrylic substrate | 1.49 | 98% | 96% | 98% |
| Comparative Example 21 | None | None | None | PET substrate | 1.58 | 95% | 95% | 95% |
| Example 27 | 1.36 | 1.082 | 1.471 | PET substrate | 1.58 | 98% | 96% | 98% |

| | Optical film | | | LCD performance | |
|---|---|---|---|---|---|
| | Wavelength dependency of transmittance of only optical film | | Luminance improvement film | Light source | Increase in transmittance of liquid crystal display device (% based on Comparative Example 1) | Color reproducibility region NTSC ratio [%] |
| | 583 nm | 630 nm | | | | |
| Comparative Example 1 | 96% | 96% | None | White LED | 0% | 72% |
| Comparative Example 2 | 96% | 97% | None | White LED | 0% | 72% |
| Comparative Example 3 | 96% | 98% | None | White LED | 0% | 72% |
| Comparative Example 8 | 96% | 97% | None | White LED | 0% | 72% |
| Example 1 | 96% | 97% | None | Triple-wavelength BKL | 2% | 100% |
| Example 2 | 96% | 97% | None | Triple-wavelength BKL | 3% | 100% |
| Example 3 | 96% | 97% | None | Triple-wavelength BKL | 2% | 100% |
| Example 4 | 96% | 97% | None | Triple-wavelength BKL | 2% | 100% |
| Example 5 | 96% | 98% | None | Triple-wavelength BKL | 4% | 100% |
| Example 6 | 96% | 97% | None | Triple-wavelength BKL | 2% | 100% |
| Example 7 | 96% | 97% | None | Triple-wavelength BKL | 2% | 100% |
| Example 8 | 96% | 97% | None | Triple-wavelength BKL | 3% | 100% |
| Example 9 | 96% | 97% | None | Triple-wavelength BKL | 2% | 100% |
| Comparative Example 4 | 97% | 96% | None | Triple-wavelength BKL | 0% | 100% |
| Comparative Example 5 | 98% | 96% | None | Triple-wavelength BKL | 0% | 100% |
| Comparative Example 6 | 98% | 96% | None | Triple-wavelength BKL | 0% | 100% |
| Comparative Example 7 | 97% | 96% | None | Triple-wavelength BKL | 0% | 100% |
| Example 10 | 96% | 98% | Bonded to optical thin film | Triple-wavelength BKL | 4% | 100% |
| Comparative Example 11 | 96% | 96% | None | White LED | 0% | 72% |
| Example 17 | 96% | 98% | None | Triple-wavelength BKL | 4% | 100% |
| Comparative Example 21 | 95% | 95% | None | White LED | 0% | 72% |
| Example 27 | 96% | 98% | None | Triple-wavelength BKL | 4% | 100% |

It was found from the above-described Table 1 that the liquid crystal display devices of the present invention had high light transmittance and a high color reproducibility region.

In contrast, it was found that the transmittance of the liquid crystal display devices of Comparative Examples 1, 11, and 21, in which a backlight side polarizing plate had no optical thin film on an air interface on a backlight side, was low. It was found that the transmittance of the liquid crystal display devices of Comparative Examples 2, 3, and 8, in which a backlight unit used a white light source which did not have a peak at a triple wavelength of RGB, was low. It was found that the transmittance of the liquid crystal display devices of Comparative Examples 4 to 7, in which the wavelength dependency of the transmittance of an optical thin film did not satisfy the ranges of the present invention while a backlight side polarizing plate had the optical thin film disposed on an air interface on a backlight side, was low.

A wavelength selection filter for blue which selectively transmitted light at a wavelength shorter than 460 nm was provided in a backlight unit of the liquid crystal display device of Example 1. As a result, favorable evaluation results were similarly obtained. In addition, a wavelength selection filter for red which selectively transmitted light at a wavelength longer than 630 nm was provided in the backlight unit of the liquid crystal display device of Example 1. As a result, favorable evaluation results were similarly obtained.

EXPLANATION OF REFERENCES

1: optical thin film
2: substrate
3: laminated body constituted of optical thin film and layer directly adjacent to optical thin film (optical film of present invention)
11: polarizing plate protective film
12: polarizer
13: polarizing plate protective film
14: backlight side polarizing plate
21: liquid crystal cell
22: luminance improvement film
31: backlight unit (backlight unit in narrow bands of R, G, and B)
32: blue light
33: green light
34: red light
41: polarizing plate protective film
42: polarizer
43: polarizing plate protective film
44: display side polarizing plate
51: liquid crystal display device

What is claimed is:

1. A liquid crystal display device comprising:
   a liquid crystal cell;
   a backlight side polarizer;
   an optical thin film which is disposed so as to be directly adjacent to a side of the backlight side polarizer opposite to the liquid crystal cell or is disposed with a substrate between the backlight side polarizer and the optical thin film, and forms an air interface; and
   a backlight unit, in this order,
   wherein the liquid crystal display device satisfies the following Expression (1),
   wherein the liquid crystal display device satisfies any one of the following Expressions (2-1), (2-2), and (2-3), wherein all transmittances at a Y value of an XYZ color system in a wavelength range of 430 nm to 470 nm, in a wavelength range of 515 nm to 555 nm, and in a wavelength range of 600 nm to 650 nm of a laminated body constituted of the optical thin film and a layer directly adjacent to the optical thin film are greater than those at a Y value of an XYZ color system in a wavelength range of greater than 470 nm and less than 515 nm and in a wavelength range of greater than 555 nm and less than 600 nm,
   wherein the backlight unit emits
   blue light which has a light emission center wavelength in a wavelength range of 430 nm to 480 nm and has a peak of light emission intensity with a full width at half maximum of less than or equal to 100 nm,
   green light which has a light emission center wavelength in a wavelength range of 500 nm to 600 nm and has a peak of light emission intensity with a full width at half maximum of less than or equal to 100 nm, and
   red light which has a light emission center wavelength in a wavelength range of 600 nm to 650 nm and has a peak of light emission intensity with a full width at half maximum of less than or equal to 100 nm, $$n(535) < nu(535) \qquad \text{Expression (1)}$$

wherein in Expression (1), n (535) represents a refractive index of the optical thin film at a wavelength of 535 nm and nu (535) represents a refractive index of the layer directly adjacent to the optical thin film at a wavelength of 535 nm, $$1.15\ \mu m \leq n(535) \times d \leq 1.25\ \mu m \qquad \text{Expression (2-1)}$$

$$1.42\ \mu m \leq n(535) \times d \leq 1.52\ \mu m \qquad \text{Expression (2-2)}$$

$$1.69\ \mu m \leq n(535) \times d \leq 1.79\ \mu m \qquad \text{Expression (2-3)}$$

wherein in Expressions (2-1), (2-2), and (2-3), n (535) represents a refractive index of the optical thin film at a wavelength of 535 nm, d represents a thickness of the optical thin film, and the unit is μm, and
   wherein the layer directly adjacent to the optical thin film is the backlight side polarizer or the substrate.

2. The liquid crystal display device according to claim 1, further comprising:
   a luminance improvement film is disposed between the backlight unit and the optical thin film.

3. The liquid crystal display device according to claim 2, wherein the luminance improvement film and the optical thin film are bonded to each other so as to have an air interface at least on a part of the surface of the optical thin film on the luminance improvement film side.

4. The liquid crystal display device according to claim 1, wherein the backlight side polarizer and the optical thin film are disposed with a substrate therebetween.

5. The liquid crystal display device according to claim 4, wherein the substrate is a cellulose acylate film, an acrylic film, or a polyester film.

6. The liquid crystal display device according to claim 1, wherein the backlight side polarizer and the optical thin film are disposed so as to be directly adjacent to each other.

7. The liquid crystal display device according to claim 1, wherein the liquid crystal display device satisfies any one of the following Expressions (2-1A), (2-2A), and (2-3A), and $$1.16\ \mu m \leq n(535) \times d \leq 1.24\ \mu m \qquad \text{Expression (2-1A)}$$

$$1.46\ \mu m \leq n(535) \times d \leq 1.51\ \mu m \qquad \text{Expression (2-2A)}$$

$$1.70\ \mu m \leq n(535) \times d \leq 1.78\ \mu m \qquad \text{Expression (2-3A)}$$

wherein in Expressions (2-1A), (2-2A), and (2-3A), n (535) represents a refractive index of the optical thin film at a wavelength of 535 nm, d represents a thickness of the optical thin film, and the unit is μm.

8. The liquid crystal display device according to claim 7, wherein the liquid crystal display device satisfies Expression (2-2A).

9. The liquid crystal display device according to claim 1, wherein all transmittances at a Y value of an XYZ color system in a wavelength range of 430 nm to 470 nm, in a wavelength range of 515 nm to 555 nm, and in a wavelength range of 600 nm to 650 nm of a laminated body constituted of the optical thin film and the layer directly adjacent to the optical thin film are greater than or equal to 97%.

10. The liquid crystal display device according to claim 1, wherein all transmittances at a Y value of an XYZ color system in a wavelength range of greater than 470 nm and less than 515 nm and in a wavelength range of greater than 555 nm and less than 600 nm of a laminated body constituted of the optical thin film and the layer directly adjacent to the optical thin film are less than 97%.

11. An optical film comprising: a polarizer or a substrate; and an optical thin film which is disposed so as to be directly adjacent on either surface of the polarizer or the substrate and forms an air interface, wherein the optical film satisfies the following Expression (1), wherein the optical film satisfies any one of the following Expressions (2-1), (2-2), and (2-3), wherein all transmittances at a Y value of an XYZ color system in a wavelength range of 430 nm to 470 nm, in a wavelength range of 515 nm to 555 nm, and in a wavelength range of 600 nm to 650 nm are greater than those at a Y value of an XYZ color system in a wavelength range of greater than 470 nm and less than 515 nm and in a wavelength range of greater than 555 nm and less than 600 nm, $$n(535) < nu(535) \qquad \text{Expression (1)}$$

wherein in Expression (1), n (535) represents a refractive index of the optical thin film at a wavelength of 535 nm and nu (535) represents a refractive index of a layer directly adjacent to the optical thin film at a wavelength of 535 nm, $$1.15\ \mu m < n(535) \times d < 1.25\ \mu m \qquad \text{Expression (2-1)}$$

$$1.42\ \mu m < n(535) \times d < 1.52\ \mu m \qquad \text{Expression (2-2)}$$

$$1.69\ \mu m < n(535) \times d < 1.79\ \mu m \qquad \text{Expression (2-3)}$$

wherein in Expressions (2-1), (2-2), and (2-3), n (535) represents a refractive index of the optical thin film at a wavelength of 535 nm, d represents a thickness of the optical thin film, and the unit is μm, and wherein the layer directly adjacent to the optical thin film is the polarizer or the substrate.

12. The optical film according to claim 11, further comprising:

a luminance improvement film is disposed on the surface of the optical thin film.

13. The optical film according to claim 12, wherein the luminance improvement film and the optical thin film are bonded to each other so as to have an air interface at least on a part of the surface of the optical thin film on the luminance improvement film side.

14. The optical film according to claim 11, further comprising:

a substrate; and the optical thin film which is disposed on one surface of the substrate and forms an air interface.

15. An optical film according to claim 14, wherein the substrate is a cellulose acylate film, an acrylic film, or a polyester film.

16. The optical film according to claim 11, further comprising:

a polarizer; and the optical thin film which is disposed on the surface of the polarizer and forms an air interface.

17. The optical film according to claim 11, wherein the optical film satisfies any one of the following Expressions (2-1A), (2-2A), and (2-3A), and $$1.16\ \mu m \leq n(535) \times d \leq 1.24\ \mu m \qquad \text{Expression (2-1A)}$$

$$1.46\ \mu m \leq n(535) \times d \leq 1.51\ \mu m \qquad \text{Expression (2-2A)}$$

$$1.70\ \mu m \leq n(535) \times d \leq 1.78\ \mu m \qquad \text{Expression (2-3A)}$$

wherein in Expressions (2-1A), (2-2A), and (2-3A), n (535) represents a refractive index of the optical thin film at a wavelength of 535 nm, d represents a thickness of the optical thin film, and the unit is μm.

18. The optical film according to claim 17, wherein the optical film satisfies the Expression (2-2A).

19. The optical film according to claim 11, wherein all transmittances at a Y value of an XYZ color system in a wavelength range of 430 nm to 470 nm, in a wavelength range of 515 nm to 555 nm, and in a wavelength range of 600 nm to 650 nm are greater than or equal to 97%.

20. The optical film according to claim 11, wherein all transmittances at a Y value of an XYZ color system in a wavelength range of greater than 470 nm and less than 515 nm and in a wavelength range of greater than 555 nm and less than 600 nm are less than 97%.

21. A polarizing plate comprising: the optical film according to claim 11.

* * * * *